(12) United States Patent
Varkey et al.

(10) Patent No.: US 11,668,872 B2
(45) Date of Patent: Jun. 6, 2023

(54) CLADDING FOR AN ELECTRO-OPTICAL DEVICE

(71) Applicant: Schlumberger Technology Corporation, Sugar Land, TX (US)

(72) Inventors: Joseph Varkey, Richmond, TX (US); Maria Grisanti, Missouri City, TX (US); David Kim, Katy, TX (US); Qingdi Huang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/547,190

(22) Filed: Aug. 21, 2019

(65) Prior Publication Data
US 2021/0055475 A1 Feb. 25, 2021

(51) Int. Cl.
| G02B 6/036 | (2006.01) |
|---|---|
| G02B 6/24 | (2006.01) |
| E21B 47/135 | (2012.01) |
| G01V 1/00 | (2006.01) |
| G02B 6/12 | (2006.01) |

(52) U.S. Cl.
CPC ............ G02B 6/036 (2013.01); E21B 47/135 (2020.05); G02B 6/24 (2013.01); *G01V 1/003* (2013.01); *G02B 2006/12138* (2013.01)

(58) Field of Classification Search
CPC .................................. G02B 6/036; G02B 6/24
See application file for complete search history.

(56) References Cited

U.S. PATENT DOCUMENTS

| 5,082,380 | A | * | 1/1992 | Sutehall | G02B 6/4408 |
| | | | | | 385/114 |
| 5,204,926 | A | | 4/1993 | Bottoms, Jr. et al. | |
| 5,222,177 | A | * | 6/1993 | Chu | G02B 6/4403 |
| | | | | | 385/105 |
| 5,224,190 | A | | 6/1993 | Chu et al. | |
| 6,661,957 | B1 | | 12/2003 | Levenson et al. | |
| 6,748,147 | B2 | * | 6/2004 | Quinn | G02B 6/4408 |
| | | | | | 385/110 |
| 6,859,590 | B1 | | 2/2005 | Zaccone et al. | |
| 6,943,300 | B2 | * | 9/2005 | Ekeberg | H01B 7/045 |
| | | | | | 174/113 C |

(Continued)

OTHER PUBLICATIONS

Camesa Downhole Cable Experts, Fiber Optics Cables, (pp. 47, 48 and 49), downloaded Oct. 26, 2020, Link: https://www.camesawireline.com/Portals/0/Documents/2019_Cames_EMC_Catalog.pdf?ver=2019-06-11-101458-960.

(Continued)

*Primary Examiner* — Tina M Wong
(74) *Attorney, Agent, or Firm* — Jeffrey D. Frantz

(57) ABSTRACT

Sensors for imaging boreholes via the detection of electrical and optical properties may be subject to harsh conditions downhole, such as from pressure and temperature. In addition, these sensors may be subject to impact, such as tension, elongation, and compression forces, along the wall of the borehole. The harsh conditions downhole and impacts on the sensor can lead to premature wear and even breaking. The present disclosure generally relates to an apparatus for measuring electrical and optical properties of the borehole and methods for manufacturing the apparatus.

20 Claims, 18 Drawing Sheets

(56) References Cited

U.S. PATENT DOCUMENTS

| | | | | |
|---|---|---|---|---|
| 7,860,362 | B2* | 12/2010 | Varkey | G02B 6/443 |
| | | | | 385/105 |
| 7,912,333 | B2* | 3/2011 | Varkey | G02B 6/4427 |
| | | | | 385/101 |
| 9,423,583 | B2* | 8/2016 | Register, III | G02B 6/4432 |
| 10,087,717 | B2* | 10/2018 | Varkey | E21B 41/00 |
| 10,522,271 | B2* | 12/2019 | Varkey | G02B 6/4483 |
| 2006/0153508 | A1 | 7/2006 | Bowker et al. | |
| 2007/0081773 | A1* | 4/2007 | Pizzorno | G02B 6/4433 |
| | | | | 385/100 |
| 2017/0343753 | A1* | 11/2017 | Bauco | G02B 6/4486 |
| 2021/0055475 | A1* | 2/2021 | Varkey | G01V 1/18 |

OTHER PUBLICATIONS

Rochester Cables, Engineered Cable Solutions for Harsh Environments, (16 pages) downloaded Oct. 26, 2020, link: https://www.te.com/commerce/DocumentDelivery/DDEController?Action=srchrtrv&DocNm=5-1773453-7_harshenvironments&DocType=DS&DocLang=EN.
International Search Report and Written Opinion issued in the PCT Application PCT/US2020/047170, dated Nov. 30, 2020 (12 pages).
International Preliminary Report on Patentability issued in the PCT Application PCT/US2020/047170 dated Mar. 3, 2022, 9 pages.
Exam Report issued under Section 18(3) in United Kingdom Patent Application GB2202062.2 dated Oct. 27, 2022, 2 pages.

* cited by examiner

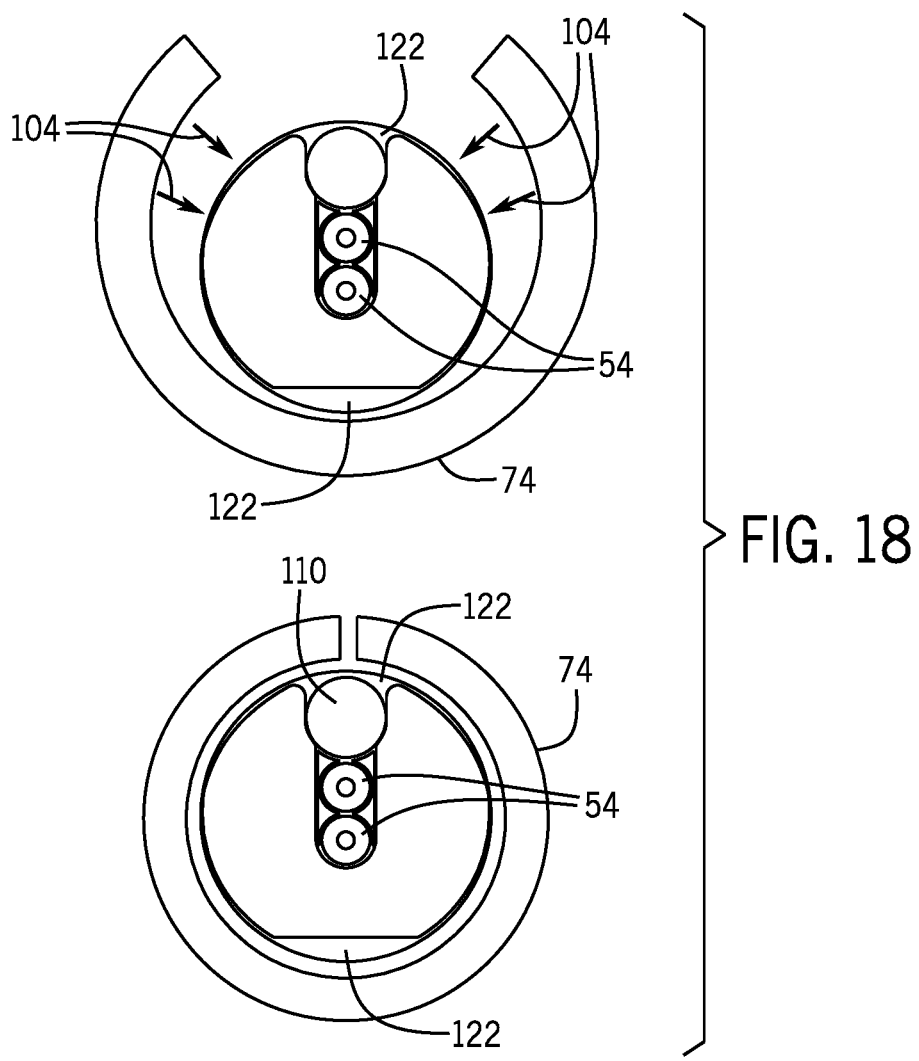
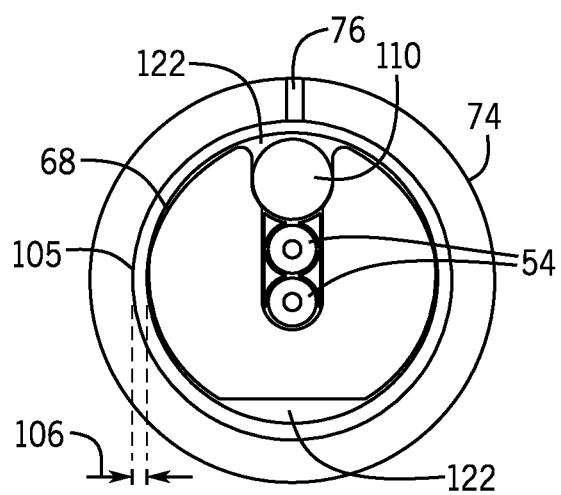
FIG. 19
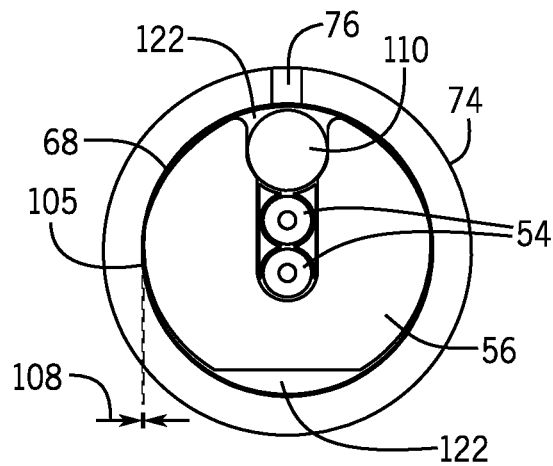
FIG. 20
FIG. 18

CLADDING FOR AN ELECTRO-OPTICAL DEVICE

BACKGROUND

This disclosure relates to detecting conditions of a borehole. In particular, this disclosure relates to an apparatus for sensing a condition of a borehole based on electrical and optical measurements with structural components that improve the durability.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties and characteristics of the geological formation surrounding the wellbore. Thus, when a wellbore is investigated to determine the physical condition of a fluid within the wellbore, a gas within the wellbore, or the wellbore itself, it may be desirable to place a cable with associated measurement tools and/or sensors within the wellbore.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present techniques are directed to a cable that includes one or more optical fibers. The cable also includes a grooved conductor that includes a recess that extends radially outward from a central portion of the grooved conductor to an end portion of the recess, wherein the one or more optical fibers are positioned within the recess, wherein an inner wall of the grooved conductor partially surrounds the one or more optical fibers. Further, the cable includes a cladding disposed around the grooved conductor and over the end portion of the recess, wherein the one or more optical fibers are maintained inside the recess of the grooved conductor, wherein the cladding includes a welded connection along a first end and a second end of the cladding, and wherein the cladding provides increased resistance to mechanical stress and reduced likelihood of gas intrusion to the optical fibers in the grooved conductor of the cable.

In another embodiment, the present techniques are direct to a method of manufacturing an electrical-optical cable for a downhole device that includes providing a grooved conductor and one or more optical fibers, wherein the grooved conductor includes a recess. The method also includes coupling one or more optical fibers to the grooved conductor by positioning the one or more optical fibers into the recess of the grooved conductor. Further, the method includes surrounding an outer surface of the grooved conductor with a cladding. Even further, the method includes connecting a first end of the cladding to a second end of the cladding and forming a seal along the connection.

In another embodiment, the present disclosure is directed to a method of manufacturing an electrical-optical cable for a downhole device that includes providing a grooved conductor and one or more optical fibers, wherein the grooved conductor includes a recess. The method also includes coupling one or more optical fibers to the grooved conductor by positioning the one or more optical fibers into the recess of the grooved conductor. Further, the method includes providing a silicone material to fill a portion within the recess that is not occupied by the one or more optical fibers. Further still, the method includes surrounding an outer surface of the grooved conductor with a cladding. Even further, the methods includes connecting a first end of the cladding to a second end of the cladding and forming a seal along the connection.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 18 is an illustration of a cross section of a partially assembled cladded sensor wire from another instant in time in the manufacturing line of FIG. 14, in accordance with an embodiment of the present disclosure;

FIG. 19 is an illustration of a cross section of a cladded sensor wire from an instant in time in the manufacturing line of FIG. 14, in accordance with an embodiment of the present disclosure;

FIG. 20 is an illustration of a cross section of a cladded sensor wire from an instant in time in the manufacturing line of FIG. 14, in accordance with an embodiment of the present disclosure;

DETAILED DESCRIPTION

Figure 1:
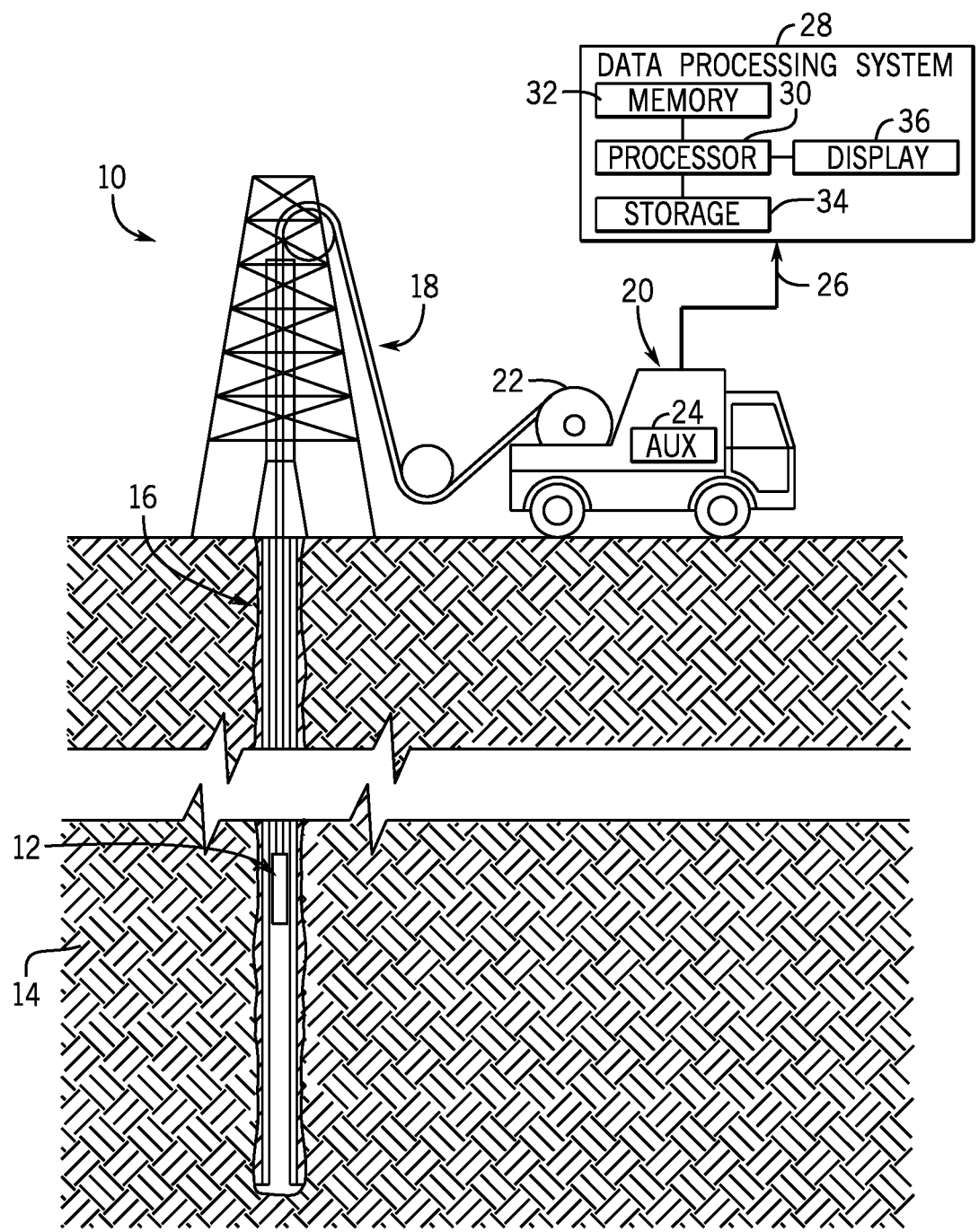
FIG. 1 is a schematic diagram of a well-logging system that employs a logging winch system, in accordance with an embodiment of the present disclosure.

One or more specific embodiments of the present disclosure will be described below. These described embodiments are examples of the presently disclosed techniques. Additionally, to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Optical fibers are used in downhole, seismic and other cables to collect distributed temperature, pressure, strain, vibration, and other distributed data and data transfer. Issues with the certain optical fibers are packed in a loose tube or are packed with stranded wires. However, these techniques may not have a working load that is suitable for all downhole conditions. The present disclosure is directed to techniques for improving the durability of optical fibers for downhole measurements. The present techniques eliminate the risk of gas through the optical fibers, reduce the optical strain of the fibers to maximize the safe working load of the cable, increase coupling of the optical fibers and the other components of the cable to lower signal to noise ratio of the optical fibers, the power delivery of the cable, the telemetry performance. Thus, the optical fibers may be used to convey a large number of possible optical signals. In some examples, these signals are used to perform measurements, and so much of the discussion below will involve examples in which the optical-fiber-containing cables are used as sensor tools. However, it should be understood that these systems and methods may apply to any suitable cables that employ optical fibers to carry any suitable signal.

One embodiment of the present disclosure relates to a method of manufacturing a cladded wire containing an optical fiber(s) and conductors, which is referred to below as a sensor cladded wire, but which may represent any suitable optical-fiber-containing cable that carries any suitable signal. The sensor cladded wire includes optical fibers provided within a recess of a conducting wire portion and is surrounded by cladding and/or shield. As referred to herein, a cross section of the conducting wire portion is a shield structure. It should be appreciated by one of ordinary skill in the art that by having the optical fibers surrounded by the grooved conductor, which is a continuous, single unit of conducting material, may reduce the likelihood of damage to the optical fibers during transport or operation, for example. Additionally, the fiber optics and grooved conductor are surrounded by cladding (e.g., cladded sensor wire). In one embodiment, the components of the sensor cladded wire that are interior to the cladding are coated with silicone to further reduce the likelihood of gas intrusion to optical fibers. In another embodiment, the sensor cladded wire includes a plug that may provide structural support for and improved mechanical durability of the optical fibers.

With this in mind, FIG. 1 illustrates a non-limiting example of a well-logging system 10 that may employ the formation texture and rock type identification systems and methods of this disclosure. It should be appreciated by one of ordinary skill in the art that various other well-logging systems may be employed, such as a well-logging system used for hydraulic fracturing. Further, the well-logging system 10 may be deployed by various suitable means. The well-logging system 10 may be used to convey a downhole tool 12 through a geological formation 14 via a wellbore 16 (also sometimes referred to as a borehole). The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

As discussed further below, the downhole tool 12 may include a number of sensors used to acquire data 26 about the wellbore 16 and/or geological formation 14 by taking measurements. In other embodiments, the optical fibers in cable 18 may be used as distributed sensor throughout the whole cable length to acquire data 26 about the wellbore 16 and/or geological formation 14 by taking measurements. The data 26 may be sent to a data processing system 28, which may analyze the data 26 to identify characteristics of the wellbore 16 and/or the geological formation 14. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may display the images generated by the processor 30. The data processing system 28 may be a local component of the logging winch system 20, a remote device that analyzes data from other logging winch systems 20, or partly local and partly remote. In some embodiments, the data processing system 28 may be a mobile computing device (e.g., tablet, smartphone, or laptop) or a server remote from the logging winch system 20.

Figure 2A:
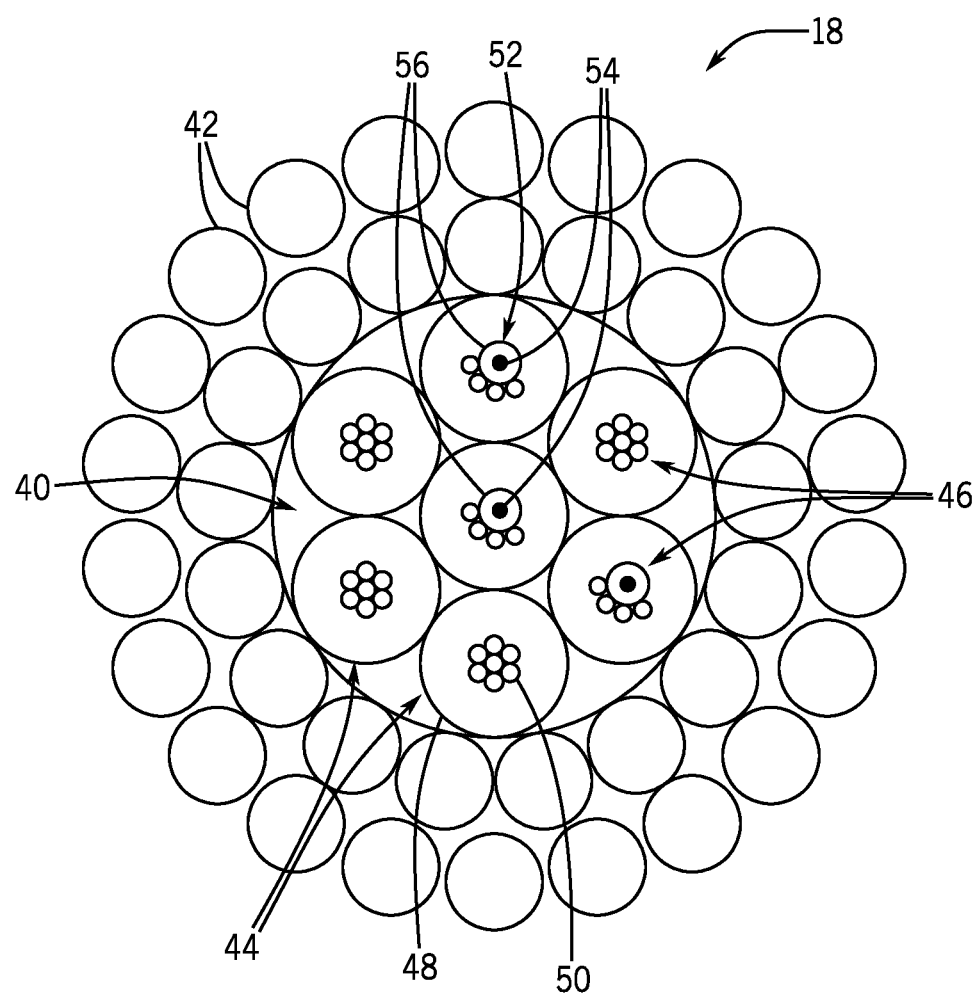
FIG. 2A is a schematic diagram of a cross section of a cable, in accordance with an embodiment of the present disclosure.

FIG. 2A is a cross sectional view of one embodiment of the cable 18. The cable 18 may be continuous or sectioned, and may be 1 meter (m), 10 m, 100 m, 1000 m or more meters in length. The cable 18 may house a cable core 40, which may be circumferentially surrounded by one or more armor wire strength members 42. The armor wire strength members 42 may be served (e.g., coiled helically) around the cable core 40, extend longitudinally along the length of the cable core 40, or be disposed about the cable core 40 in any fashion suitable to surround the cable core 40. The armor wire strength members 42 may physically protect the cable core 40 and may provide additionally rigidity to the cable 18. In addition, the armor wire strength members 42 may support the weight of the cable 18 and alleviate strain on the cable core 40. In other embodiments, the cable 18 may be fully jacketed by means of reinforced jacket over the armor wire strength members 42.

The cable core 40 may include one or more signal cables 44. The signal cables 44 may include internal wires 46 disposed within protective structures 48. The internal wires 46 may include copper wires 50, optical-fiber-containing sensor wires 52, or any other suitable wires desired within the cable 18. The optical-fiber-containing sensor wires 52 may include one or more optical fibers 54 disposed within grooved conductors 56. The one or more optical fibers 54 may serve as sensors (e.g., pressure sensor, temperature sensor, vibration sensor, strain sensor) which may sense internal conditions of the wellbore 16 (e.g., pressure, temperature) and relay data regarding the internal conditions to the data processing system 28. The internal wires 46 may additionally transmit instructional signals or electrical power to a component coupled to the end of the cable 18 (e.g., the downhole tool 12). The optical-fiber-containing sensor wires 52 may also be disposed within the armor wire strength member 42.

Figure 2B:
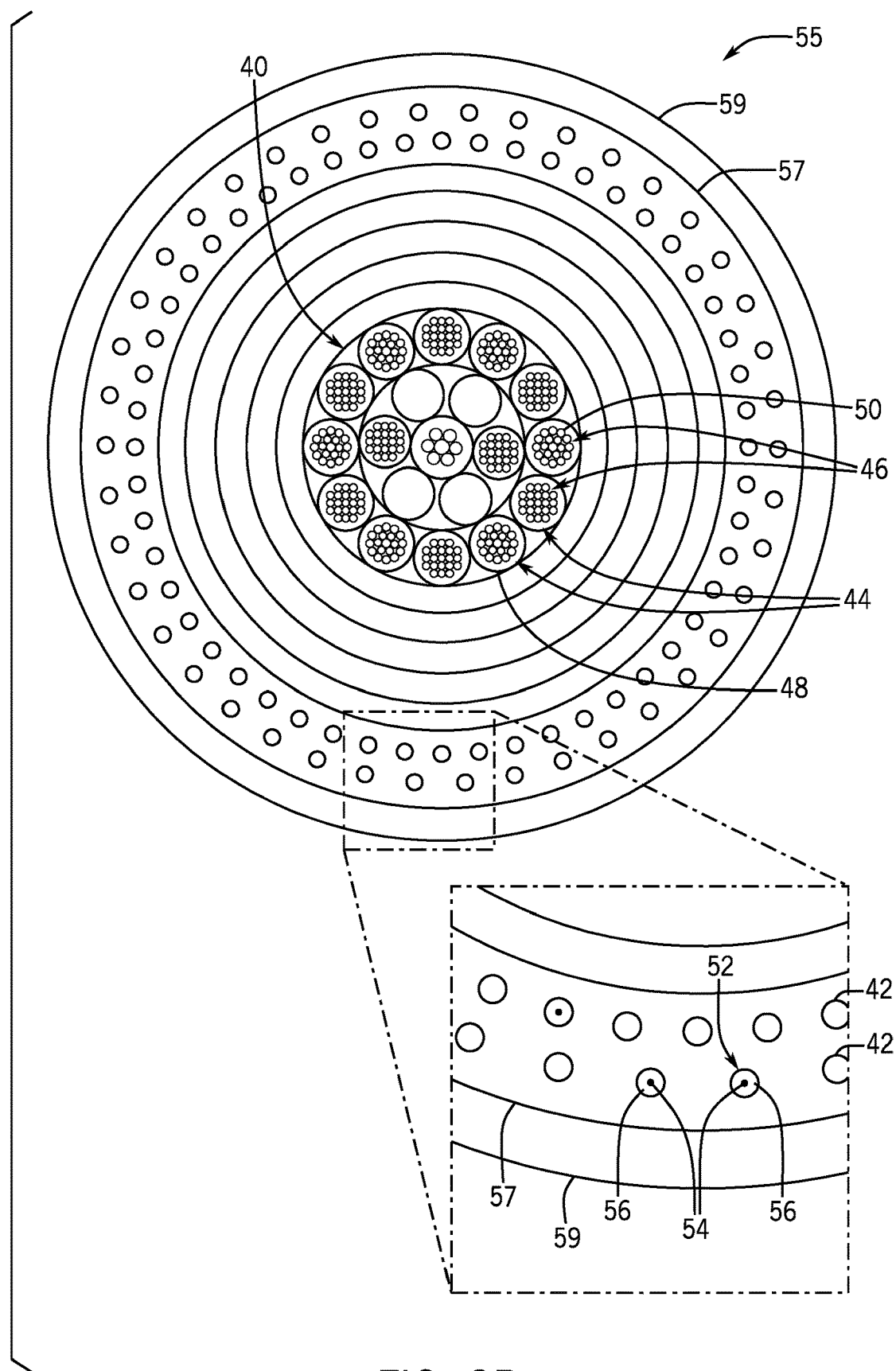
FIG. 2B is a schematic diagram of a cross section of a sensor portion of a cable, in accordance with an embodiment of the present disclosure.
Figure 2C:
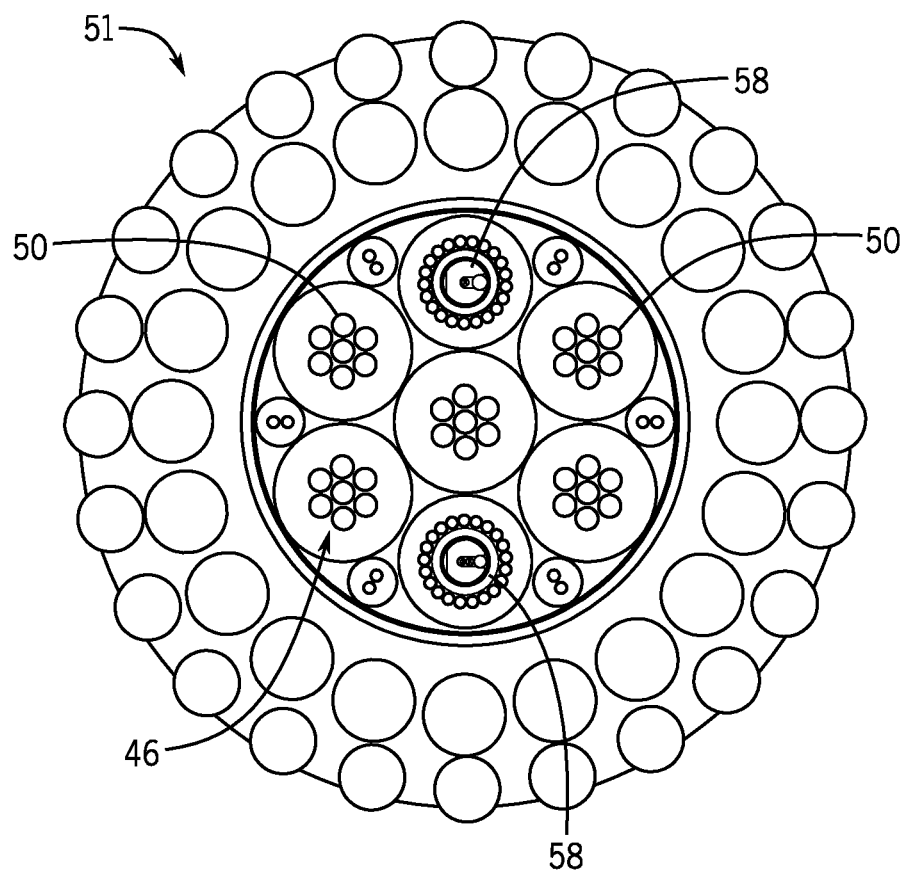
FIG. 2C is a schematic diagram of a cross section of another cable, in accordance with an embodiment of the present disclosure.
Figure 2D:
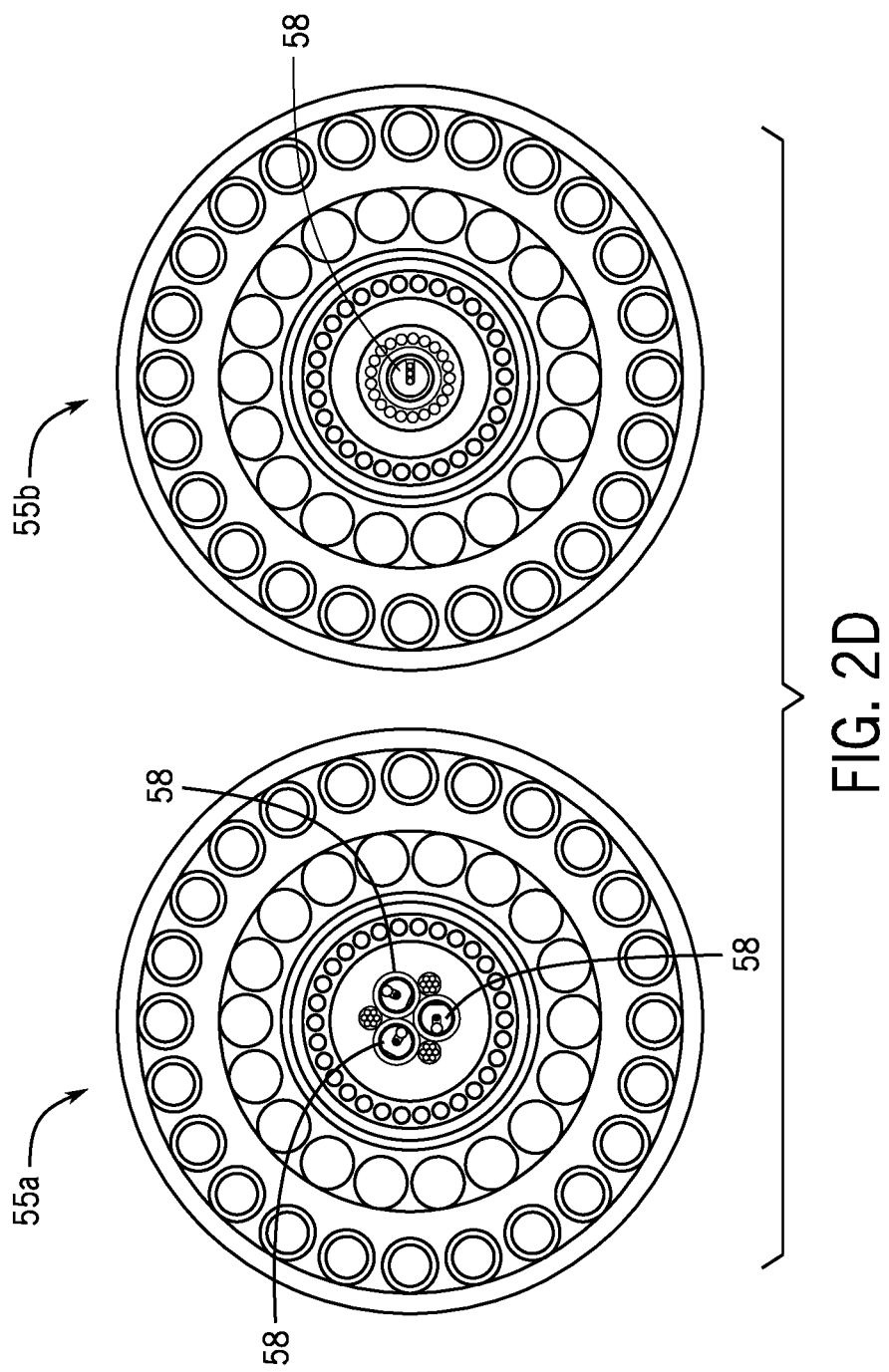
FIG. 2D is a schematic diagram of a cross section of another cable, in accordance with an embodiment of the present disclosure.

FIG. 2B is a cross sectional view of a marine cable 55. The marine cable 55 may include the cable core 40. The cable core 40 may include the one or more signal cables 44. The signal cables 44 may include the internal wires 46 disposed within the protective structures 48. The internal wires 46 may include the sensors (e.g., the one or more optical fibers 54), copper wires 50, or any other suitable wires desired within the cable 18. The internal wires 46 may also include the optical-fiber-containing sensor wires 52. The internal wires 46 may transmit instructional signals or electrical power to a component coupled to the end of the marine cable 55 (e.g., the downhole tool 12). The protective structures 48 may encase the internal wires 46 and physically protect the internal wires during operation of the cable 18. To achieve a better signal to noise ratio with regard to the parameters being monitored (e.g., temperature, pressure, seismic profiling, or others), the optical-fiber-containing sensor wires 52 may be located near the outside perimeter of the marine cable 55. The optical-fiber-containing sensor wires 52 may be disposed within a shielding layer 57 of the marine cable 55. The shielding layer 57 may additionally be encased by a protective outer layer 59. It should be appreciated by one of ordinary skill in the art that the optical-fiber-containing sensor wires 52, or those with cladding (e.g., cladded sensors wires 58), as discussed further below, may be used for the cables above as well as various other suitable types of cables. For example, FIG. 2C and FIG. 2D illustrates a hepta cable 51 and coax jacket cables 55*a*, 55*b*, respectively, that include cladded sensor wires 58.

Figure 3:
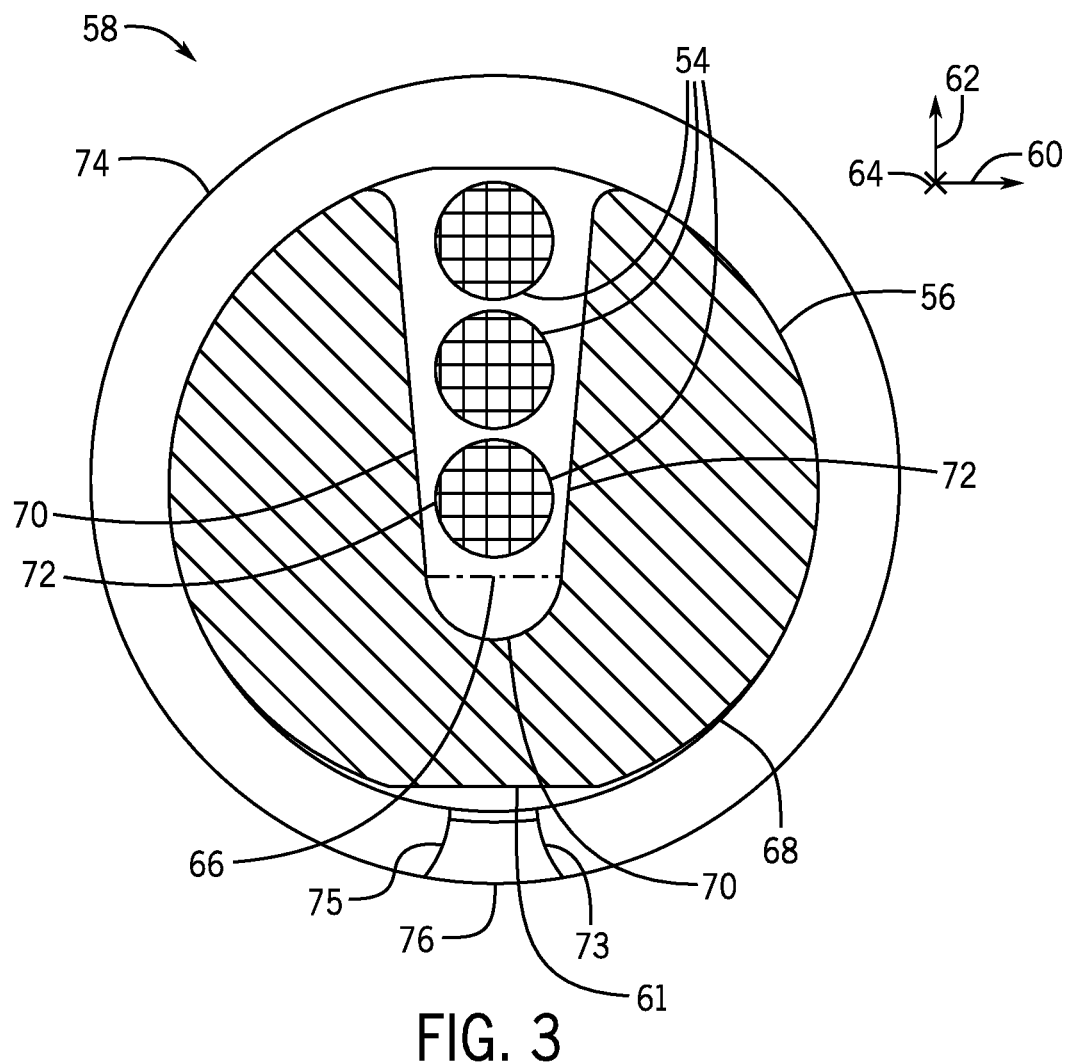
FIG. 3 is a schematic diagram of a cross section of a sensor portion of a cable, in accordance with an embodiment of the present disclosure.

FIG. 3 illustrates a cross-sectional view of an embodiment of a cladded sensor wire 58 (e.g., cladded one-piece optical-fiber-containing sensor wire 52 or electrical-optical cable). To facilitate discussion, the various embodiments of the cladded sensor wire 58 may be described with reference to an 'x' direction 60, a 'y' direction 62, and a 'z' direction 64. The cladded sensor wire 58 includes a grooved conductor 56 disposed about the one or more optical fibers 54. The grooved conductor 56 may include a conductor (e.g., copper) or any alloy suitable for the desired purpose. The one or more optical fibers 54 may be disposed within a recess 66 of the grooved conductor 56. The one or more optical fibers 54 may be embedded symmetrically, or asymmetrically within the recess 66. The recess 66 may extend radially from the center of the grooved conductor 56 to an outer surface 68 of the grooved conductor 56. Although FIG. 3 shows an embodiment of the grooved conductor 56 with a generally circular or C-shape, the grooved conductor 56 may take any suitable shape, such as square, triangular, or oval.

As shown, there is a small gap within the recess 66 between the optical fibers 54 and the interior surface 70 of the grooved conductor. The small gap may facilitate the placement of the optical fibers 54 within the recess 66. In some embodiments, the small gap (e.g., distance between the interior surface 70 of the grooved conductor 56 and the optical fibers 54 may be smaller and may maintain a coupling effect. For example, the grooved conductor 56 and optical fibers 54 may be in physical contact with an interior surface 70 of the recess 66. The interior surface 70 may contact the one or more optical fibers 54 at diametrically opposite contact points 72, such that the interior surface 70 may extend tangentially to the diametrically opposite contact points 72. The diametrically opposite contact points 72 may ensure that any external pressure applied to the grooved conductor 56 will apply a transverse (e.g., 'y' direction 62) force to the one or more optical fibers 54. Ideally, the pressure may be applied to the grooved conductor 56 in a direction perpendicular to the interior surface 70 of the recess 66 (e.g., 'y' direction 62). Additionally or alternatively, pressure may be applied to the grooved conductor 56 in any combination of the 'x' direction 60, 'y' direction 62, and/or 'z' direction 64.

As illustrated, the grooved conductor 56 is not completely circular. In particular, when the cladding 74 surrounds the grooved conductor 56, a recess 61 (e.g., void, or gap) is formed between the cladding 74 and grooved conductor 56. The recess 61 may be useful for pressure testing the cladded sensor wire 58 during assembly, as discussed further below. Additionally, the recess 61 may reduce any mechanical stress that results from thermal expansion of the grooved conductor 58.

The ends 73 and 75 of the cladding are connected (e.g., welded), forming a welded connection 76. As illustrated, the welded connection is radially offset from the opening of the recess 66. That is, the opening of the recess 66 and the welded connection 76 may not overlap. As discussed herein, it may be advantageous to offset the welded connection from the opening of the recess 66 in assembly.

Figure 4:
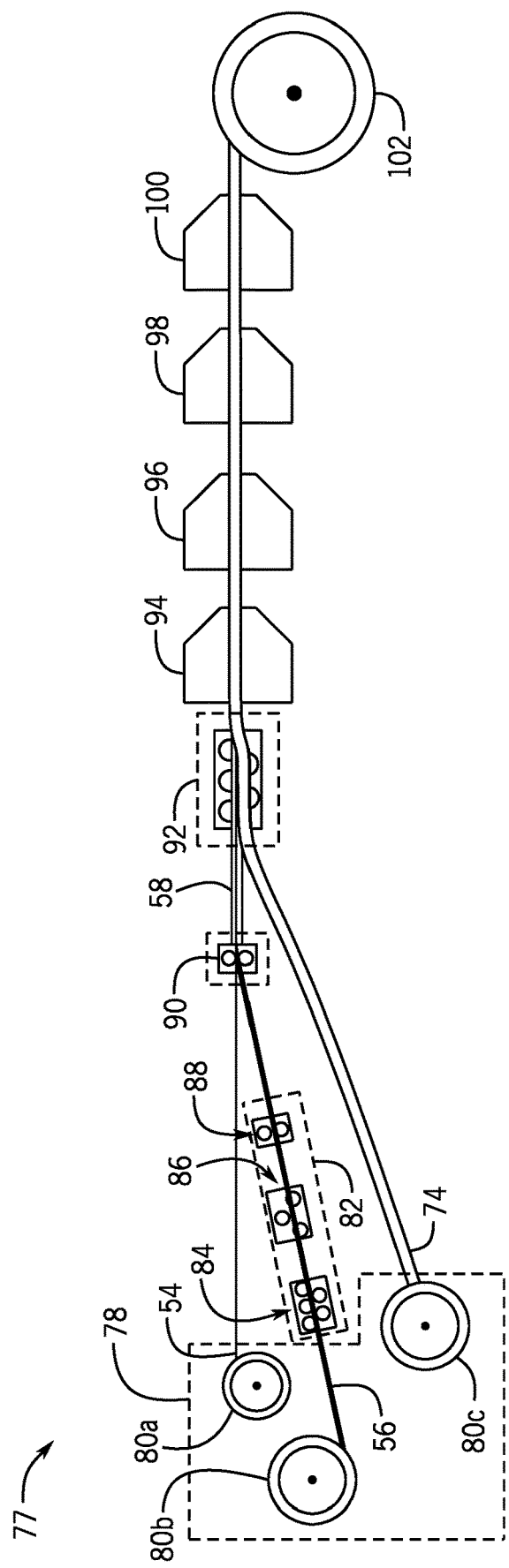
FIG. 4 is a schematic diagram of a manufacturing line for a cladded sensor wire, in accordance with an embodiment of the present disclosure.

FIG. 4 is a schematic diagram of a manufacturing line 77 that may be utilized to generate the cladded sensor wire 58, as shown in FIG. 3, in accordance with an embodiment of the present disclosure. In general, the optical fibers 54 are placed inside the recess 66 of the grooved conductor 56 followed by providing a cladding 74 around the grooved conductor 56 that includes the one or more optical fibers 54. It should be appreciated that the manufacturing line 77 may be used for any number of optical fibers 54.

At station 78, optical fiber(s) 54, the grooved conductor 56, and the cladding 74 are provided in respective pay-offs 80*a*, 80*b*, and 80*c* respectively. In some embodiments, the pay-off 80*a* includes multiple optical fibers 54, or three pay-offs 80*a* are provided that each include an optical fiber 54. The grooved conductor 56 (e.g., a wire-like structure that is shaped to have the grooved conductor 56 cross section) is guided through the manufacturing line 77 to the station 82 which includes straighteners 84, rollers 88, and tension sensors 86 to maintain groove orientation, shaped conductor (e.g., grooved conductor 56) form, and alignment for a subsequent positioning of the cladding 74. At station 90, the optical fibers 54 are inserted into the recess 66 of the grooved conductor 56 and maintained until the cladding 74 is added. It should be appreciated that the type of alignment rollers is dependent on the shape of the grooved conductor 56 and/or number of optical fibers 54.

At station 92, the cladding 74 is positioned around the grooved conductor 56 that includes the optical fiber(s) 54, thus producing the cladded sensor wire 58. It should be appreciated that any suitable machines may be used for providing (e.g., positioning, forming) the cladding 74 around the grooved conductor 56 that includes the optical fiber(s) 54, such as insertion rollers. Positioning the cladding 74 includes rolling the cladding 74 such that the cladding 74 forms a circular tube that surrounds the grooved conductor 56. At station 94, the ends 73 and 75 of the cladding 74 are welded together to produce a welded connection 76. As discussed above, with regards to FIG. 3, the welded connection 76 may be offset from the opening in the recess 66. This may reduce the likelihood of damaging the optical fiber(s) 54 during manufacturing such as during welding connection 76 process. Returning back to manufacturing line 77, the cladding 74 with the welded connection 76 are drawn through a die to create a tight fit between the grooved conductor 56 (e.g., along the outer surface 68 of the grooved conductor 56) and the cladding 74, at station 96. Any void spaces between the cladding 74 and the grooved conductor 56 may be used to pressure test the cladding 74 and ensure that no pinholes or defects are present. Then, the cladded sensor wire 58 may be inspected (i.e., carry out performance tests, leak tests such as eddy current, laser diameter, or other suitable techniques) at station 98 before passing through a station 100 (e.g., that may include a capstan unit) to produce a packaged cladded sensor wire at station 102 (e.g., rolled up in a pay-off).

Figure 5:
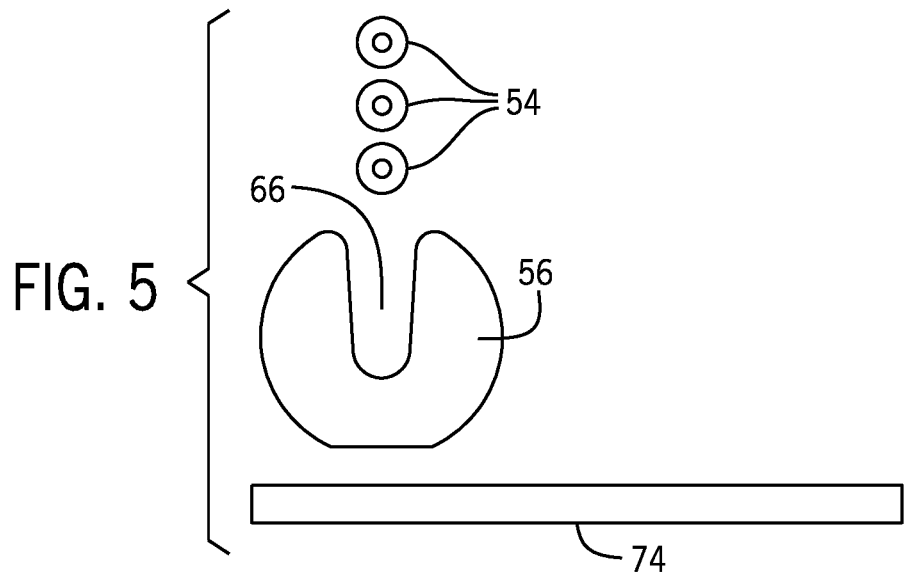
FIG. 5 is an illustration of a cross section of the components of a cladded sensor wire from an instant in time in the manufacturing line of FIG. 4, in accordance with an embodiment of the present disclosure.
Figure 6:
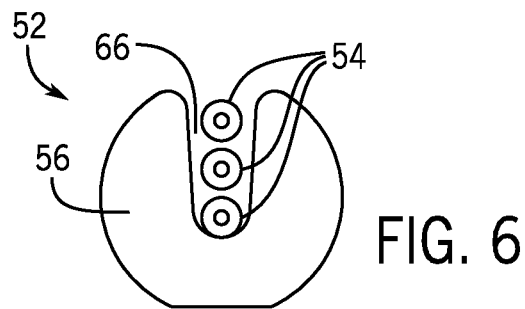
FIG. 6 is an illustration of a cross section of a partially assembled cladded sensor wire from another instant in time in the manufacturing line of FIG. 4, in accordance with an embodiment of the present disclosure.
Figure 7:
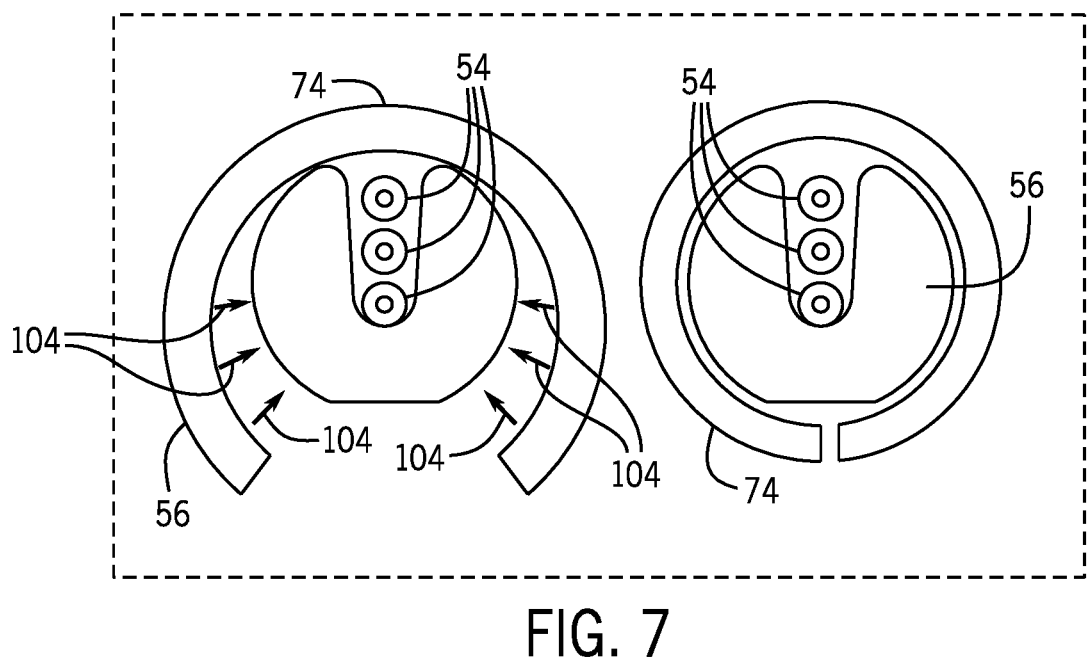
FIG. 7 is an illustration of a cross section of a partially assembled cladded sensor wire from another instant in time in the manufacturing line of FIG. 4, in accordance with an embodiment of the present disclosure.
Figure 8:
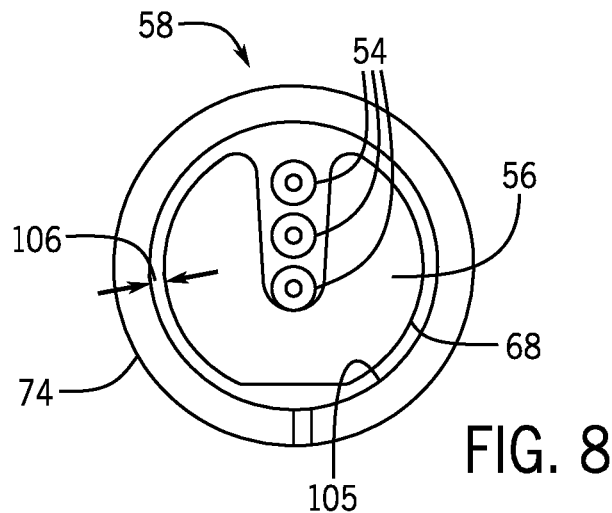
FIG. 8 is an illustration of a cross section of a partially assembled cladded sensor wire from another instant in time in the manufacturing line of FIG. 4, in accordance with an embodiment of the present disclosure.
Figure 9:
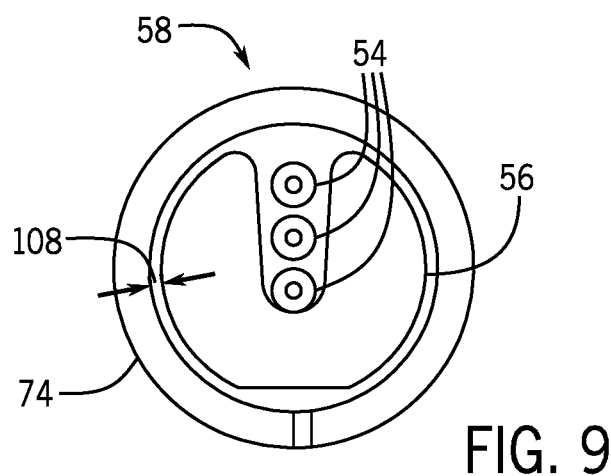
FIG. 9 is an illustration of a cross section of a cladded sensor wire from an instant in time in the manufacturing line of FIG. 4, in accordance with an embodiment of the present disclosure.

FIGS. 5-9 show several points in time of the optical fibers 54, the grooved conductor 56, cladding 74, and cladded sensor wire 58 during the stations 78, 90, 92, 94, and 96 of the manufacturing line 77, as described for FIG. 4. For example, FIG. 5 is an illustration of a cross section of the optical fibers 54, a cross section of the grooved conductor 56, and a cross section of the cladding 74, which are in respective pay-offs 80*a*, 80*b*, and 80*c*, in station 78. FIG. 6 shows three optical fibers 54 positioned in the recess 66 of the grooved conductor 56, representing a point in time of station 90 of the manufacturing line 77. FIG. 7 (left) shows the cladding 74 positioned around the grooved conductor 56 that includes the optical fibers 54, representing a point in time of station 92 of the manufacturing line 77. The arrows 104 illustrated the cladding 74 disposed radially about the grooved conductor 56. FIG. 7 (right) shows the cladding 74 positioned around the grooved conductor 56, representing a second point in time of station 92 of the manufacturing line #. FIG. 8 shows the cladding 74 connected along the ends 75 and 73 with a welded connection 76, representing a point in time of station 94 of the manufacturing line 77. As illustrated, the outer surface 68 of the grooved conductor 56 and the inner surface 105 of the cladding 74 are separated by a first distance 106. FIG. 9 shows the cladding 74 connected along the ends 73 and 75 with a welded connection 76, representing a point in time of station 96 of the manufacturing line 77. As illustrated, the outer surface 68 of the grooved conductor 56 and the inner surface 105 of the cladding 74 are separated by a second distance 108 that is smaller than the first distance 106. This is indicative of the tight fit created in station 96.

Figure 10:
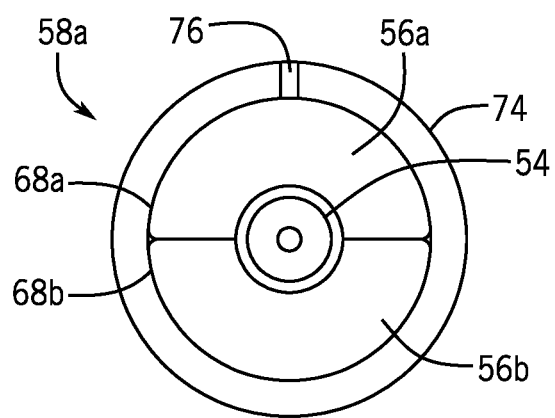
FIG. 10 is an illustration of an example of a cladded sensor wire, in accordance with an embodiment of the present disclosure.

FIGS. 10-13 show several embodiments of the cladded sensor wire 58. FIG. 10 shows a cladded sensor wire 58a that includes two grooved conductors 56a and 56b. Each grooved conductor 56a and 56b partially surround the optical fibers 54. As illustrated, the grooved conductors 56a and 56b each are generally a semi-circle and each grooved conductor may include a respective recess 66 where the optical fiber 54 reside. In some embodiments, each grooved conductor 56a and 56b generally form different fractions of a circle (10%, 25%, 50%, and 75%). For example, grooved conductor 56a may form a quarter circle and grooved conductor 56b may form three-quarters of a circle.

Figure 13:
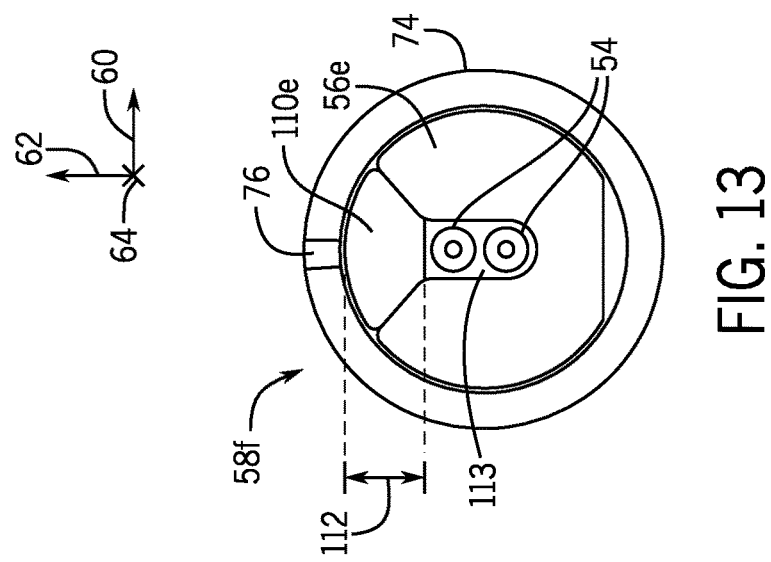
FIG. 13 is an illustration of an example of a cladded sensor wire with a wedge-shaped plug, in accordance with an embodiment of the present disclosure.
Figure 12:
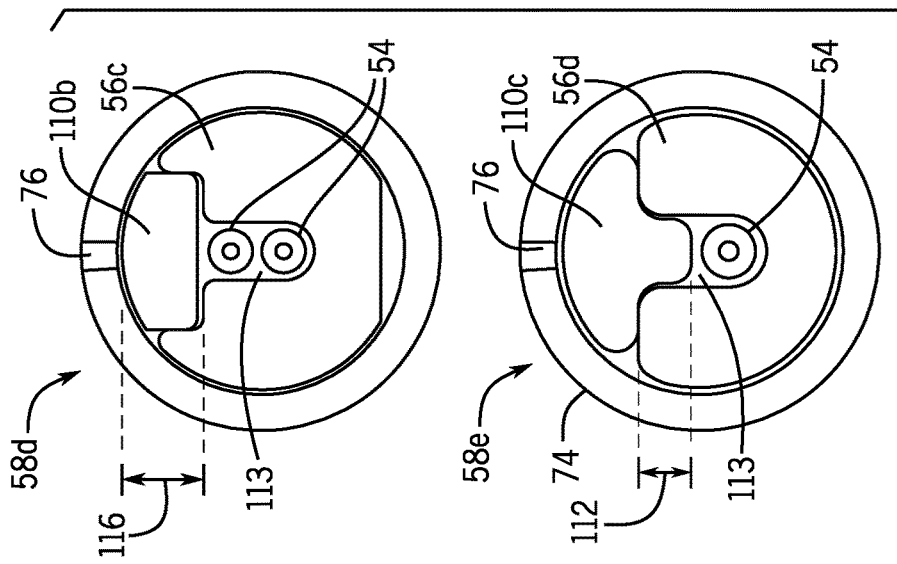
FIG. 12 is an illustration of another example of a cladded sensor wire with examples of plugs and caps, in accordance with an embodiment of the present disclosure.
Figure 11:
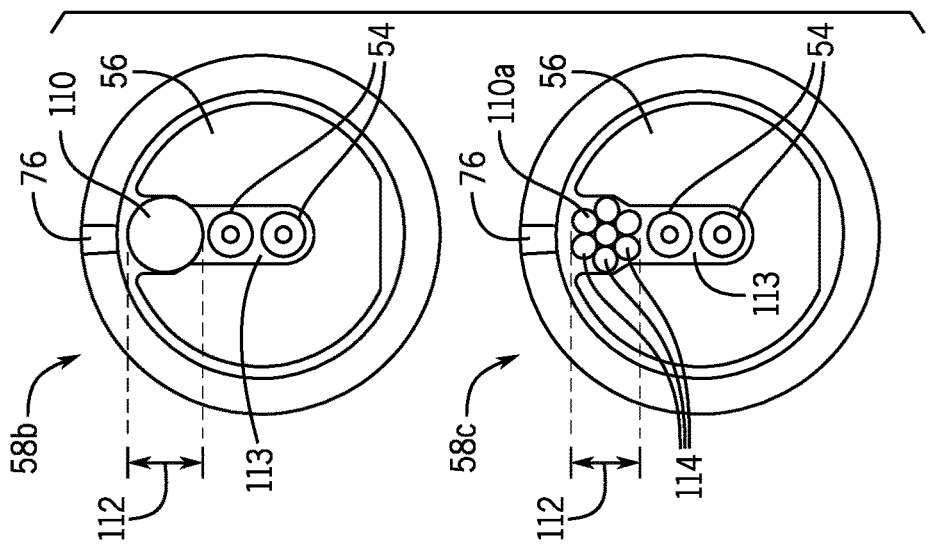
FIG. 11 is an illustration of an example of a cladded sensor wire with a plug, in accordance with an embodiment of the present disclosure.

FIGS. 11-13 shows different examples of cross sections of cladded sensor wires 58 that include plugs/caps 110. FIG. 11 shows a cross section of a cladded sensor wire 58b that includes a grooved conductor 56 and plug 110. In some embodiments, a plug 110 may be inserted into the first end portion 112 of the recess 66, forming an enclosed recess 113 within the grooved conductor 56. The plug 110 may be pressure fit into the grooved conductor 56 and/or bonded to the grooved conductor via an adhesive (e.g., welding, bonding glue). The plug 110 may extend longitudinally (e.g., 'z' direction 64) along the length of the grooved conductor 56 and form a hermetic seal between the one or more optical fibers 54 within the enclosed recess 113 and an external environment 80. The external environment 80 may contain fluids that can damage a coating of the one or more optical fibers 54 and result in optical losses within the one or more optical fibers 54. For example, the ingress of hydrogen into the enclosed recess 113 may result in a subsequent formation of hydroxide ions (OH—) that may absorb light at a number of important wavelengths, thereby decreasing the signal strength of the one or more optical fibers 54.

In some embodiments, the cladded sensor wire 58 may be a pressure sensor. For example, the plug 110 may additionally form an elongated pressure seal which may ensure that the pressure differential between the enclosed recess 113 and the external environment 80 is not equalized. The space between the enclosed recess 113 and the one or more optical fibers 54 may include a buffer fluid. In one embodiment, the buffer fluid may include a gas such as air; in another, a vacuum may be employed in place of the buffer fluid. Employing air as the buffer fluid may reduce or eliminate variations in pressure readings caused by manometric effects (e.g., the sensor reading the weight of the buffer fluid rather than the external pressure). The plug 110 may include any suitable material, such as copper, aluminum, or organic compounds. Moreover, multiple optical fibers 54 can be inserted in the enclosed recess 113 (i.e., the recess 66 before the plug 110 is inserted) to provide different information. This may be due to the different positions of the multiple optical fibers 54 in the recess 66. In addition, optical fibers 54 with symmetric internal structures that inserted in different orientations may experience different responses to external pressure.

In general, the grooved conductor 56 and the plug 110 may have various combinations of shapes. That is, in some embodiments, the plug 110 may act as a cap to the grooved conductor 56 (e.g., resides on top of the grooved conductor 56), while in other embodiments, a portion of the plug 110 may reside in the recess 66 of the grooved conductor 56. FIG. 11 also shows a cross section of a cladded sensor wire 58c with optical fibers 54 that includes a grooved conductor 56 with a plug 110a that forms the enclosed recess 113. The plug 110a is a strand of conductors 114. FIG. 12 shows a cross section of cladded sensor wires 58d and 58e that each include optical fibers 54. The cladded sensor wire 58d includes a grooved conductor 56c with a plug 110b that forms the enclosed recess 113. As illustrated, the plug 110b is a shaped such that it couples to (e.g., resides in) a portion 116 of the grooved conductor 56c. The cladded sensor wire 58e includes a grooved conductor 56d with a plug 110c that forms the enclosed recess 113. As illustrated, the plug 110c is shaped such that it couples to a portion 112 of the grooved conductor 56d. FIG. 13 shows a cross section of a cladded sensor wire 58f with optical fibers 54 that includes a grooved conductor 56e with a plug 110e that forms the enclosed recess 113. The plug 110e is a wedge that is shaped to couple with the grooved conductor 56e.

The various embodiments illustrated in FIGS. 10-13 may protect the optical fibers 54 during the welding (e.g., at station 94). Further, these techniques may provide greater collapse and shear resistance and potentially deliver more power as the cross sectional area of the conductor (e.g., grooved conductor 56 and plugs/caps 110) is larger compare to conductors 56 without plug/caps 110 shown in FIG. 8-9. Additionally, the optical fibers 54, plus 110, and grooved conductors 56 of each of the cladded sensor wires 58 shown in FIG. 10-13 may assembled, positioned, and locked in place before the cladding 74 is added.

Figure 14:
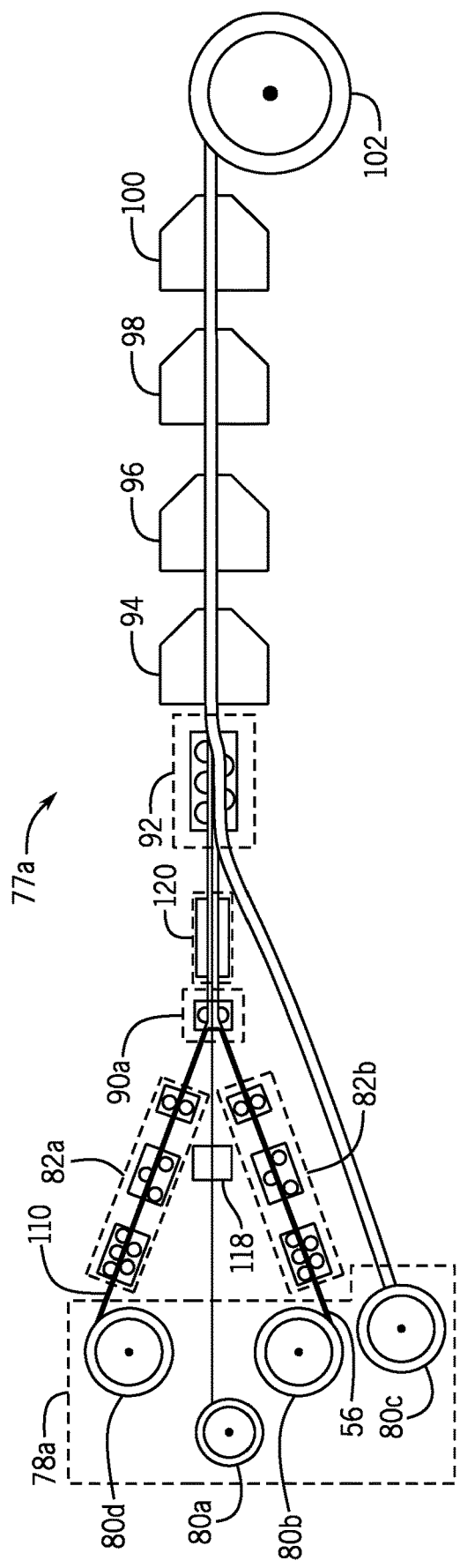
FIG. 14 is a schematic diagram of a manufacturing line for a cladded sensor wire with a plug, in accordance with an embodiment of the present disclosure.

FIG. 14 is a schematic diagram of a manufacturing line 77a that may be utilized to generate the cladded sensor wires 58, such as the cladded sensor wires shown in FIGS. 10-13, in accordance with an embodiment of the present disclosure. The disclosed techniques provide a process for simultaneous process of assembling for the cladded sensor wire 58, which provides several advantages (e.g., improved power, reduced strain) as discussed herein. In general, the optical fibers 54 are placed inside the recess 66 of the grooved conductor 56 followed by providing a cladding 74 around the grooved conductor 56 that includes the one or more optical fibers 54. It should be appreciated that the manufacturing line 77a may be used for any number of optical fibers 54.

At station 78a, optical fiber(s) 54, the grooved conductor 56, and the cladding 74 are provided in respective pay-offs 80a, 80b, and 80c respectively. Additionally, station 78a of the manufacturing line 77a includes a payoff 80d that includes the plug 110. In some embodiments, the pay-off 80a includes multiple optical fibers 54, or three pay-offs 80a are provided that each include an optical fiber 54. The grooved conductor 56 (e.g., a wire-like structure that is shaped to have the grooved conductor 56 cross section) is guided through the manufacturing line 77a to the station 82b which includes straighteners 84, rollers 88, and tension sensors 86 to maintain groove orientation, shaped conductor form, and alignment for a subsequent positioning of the cladding 74. The plug 110 is guided to a station 82a which includes straighteners 84, rollers 88, and tension sensors 86.

It should be appreciated that the type of alignment rollers is dependent on the shape of the grooved conductor 56 and/or number of optical fibers 54.

At station 118 the optical fibers are coated with silicone, or other suitable filler material such as various polymers or resin. The silicone may fill void spaces in the recess, as discussed in more detail below, (e.g., spaces not occupied by the optical fibers 54), which may further reduce the void spaces for the fluid to travel, which reduces likelihood of leaks, improves coupling between the components (e.g., optical fibers 54 and grooved conductor 56), and provide support for the optical fibers 54. Then, at station 90*a*, the optical fibers 54, which are now coated with silicone, are inserted into the recess 66 of the grooved conductor 56 and plug 110 is inserted or placed on recess 66 (e.g., into end portion 112 or portion 116) of the grooved conductor 56 and maintained until the cladding 74 is added.

At station 92, the cladding 74 is positioned around the grooved conductor 56 that includes the optical fiber(s) 54 coated with a silicone layer, thus producing the cladded sensor wire 58. It should be appreciated that any suitable machines may be used for providing (e.g., positioning, forming) the cladding 74 around the grooved conductor 56 that includes the optical fiber(s) 54, such as insertion rollers. Then, the grooved conductor 56, which includes the optical fibers(2) 54 coated with silicone, is immersed in a silicone application unit (e.g., station 120) that may include application of silicone to outer spaces of the grooved conductor 56 and techniques for removing excess silicone material. Additionally, station 120 may include a silicone curing step (e.g., through heat or ultraviolet (UV) radiation). Further, the station 120 may include an external silicone application and/or curing step.

Continuing with the manufacturing line 77*a*, at station 94, the ends 73 and 75 of the cladding 74 are welded together to produce a welded connection 76. Then, the cladding 74 with the welded connection 76 are drawn through a die to create a tight fit between the grooved conductor 56 (e.g., along the outer surface 68 of the grooved conductor 56) and the cladding 74, at station 96. Then, the cladded sensor wire 58 may be inspected at station 98 before passing through a station 100 (e.g., that may include a capstan unit) to produce a packaged cladded sensor wire at station 102 (e.g., rolled up in a pay-off).

Figure 15:
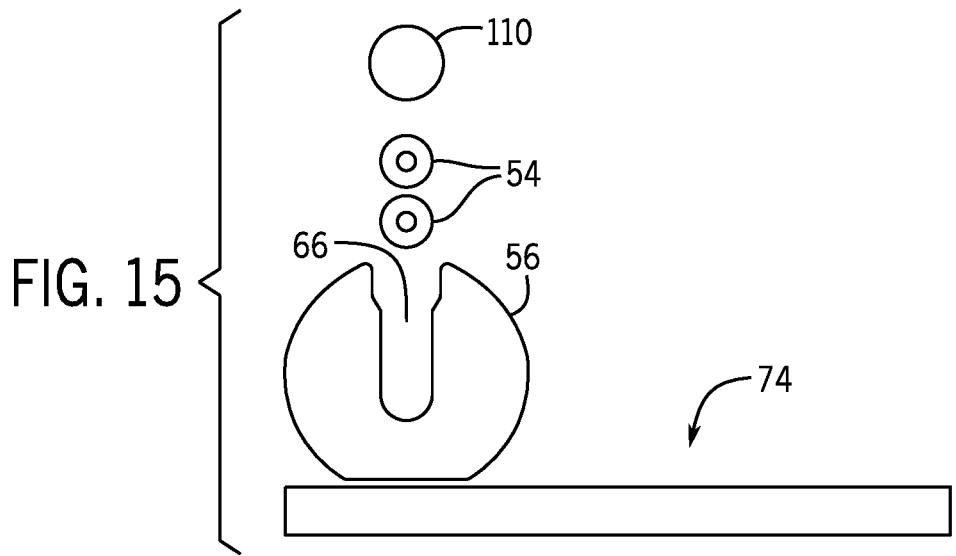
FIG. 15 is an illustration of a cross section of the components of a cladded sensor wire from an instant in time in the manufacturing line of FIG. 14, in accordance with an embodiment of the present disclosure.
Figure 16:
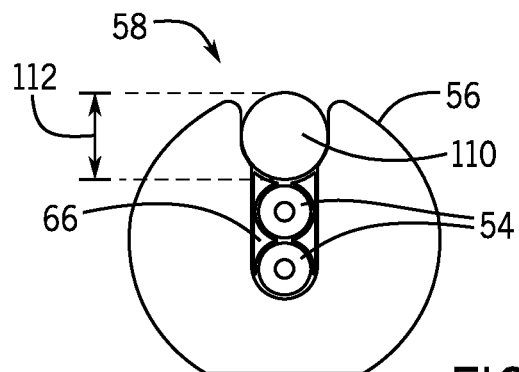
FIG. 16 is an illustration of a cross section of a partially assembled cladded sensor wire from another instant in time in the manufacturing line of FIG. 14, in accordance with an embodiment of the present disclosure.
Figure 17:
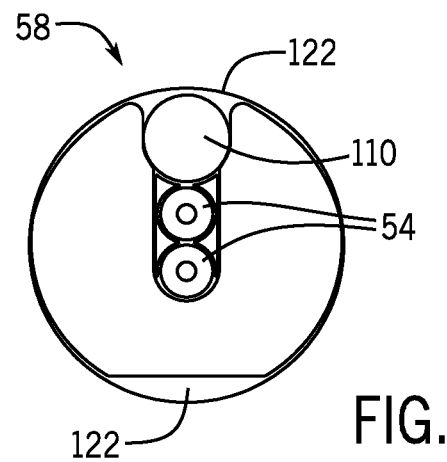
FIG. 17 is an illustration of a cross section of a partially assembled cladded sensor wire from another instant in time in the manufacturing line of FIG. 14, in accordance with an embodiment of the present disclosure.

FIGS. 15-20 show several points in time of the optical fibers 54, the grooved conductor 56, cladding 74, and cladded sensor wire 58 during the stations 78*a*, 90*a*, 120, 92, 94, and 96 of the manufacturing line 77*a*, as described for FIG. 14. For example, FIG. 15 is an illustration of a cross section of the optical fibers 54, a cross section of the grooved conductor 56, a cross section of the cladding 74, and a cross section of the plug 110, which are in respective pay-offs 80*a*, 80*b*, 80*c*, and 80*d*, in station 78*a*. FIG. 16 shows three optical fibers 54 positioned in the recess 66 of the grooved conductor 56 and the plug 110 positioned in the end portion 112, representing a point in time of station 90*a* of the manufacturing line 77*a*. FIG. 17 shows the cured silicone 122 that fills different voids in the grooved conductor 56 representing in time of station 120. FIG. 18 (top) shows the cladding 74 positioned around the grooved conductor 56 that includes the optical fibers 54 and the cured silicone 122, representing a point in time of station 92 of the manufacturing line 77*a*. The arrows 104 illustrated the cladding 74 disposed radially about the grooved conductor 56. FIG. 18 (bottom) shows the cladding 74 positioned around the grooved conductor 56, representing a second point in time of station 92 of the manufacturing line 77*a*. FIG. 19 shows the cladding 74 connected along the ends 75 and 73 with a welded connection 76, representing a point in time of station 94 of the manufacturing line 77*a*. As illustrated, the outer surface 68 of the grooved conductor 56 and the inner surface 105 of the cladding 74 are separated by a first distance 106. FIG. 20 shows the cladding 74 connected along the ends 73 and 75 of the cladding 74 with a welded connection 76, representing a point in time of station 96 of the manufacturing line 77*a*. As illustrated, the outer surface 68 of the grooved conductor 56 and the inner surface 105 of the cladding 74 are separated by a second distance 108 that is smaller than the first distance 106. This is indicative of the tight fit created in station 96.

Figure 21:
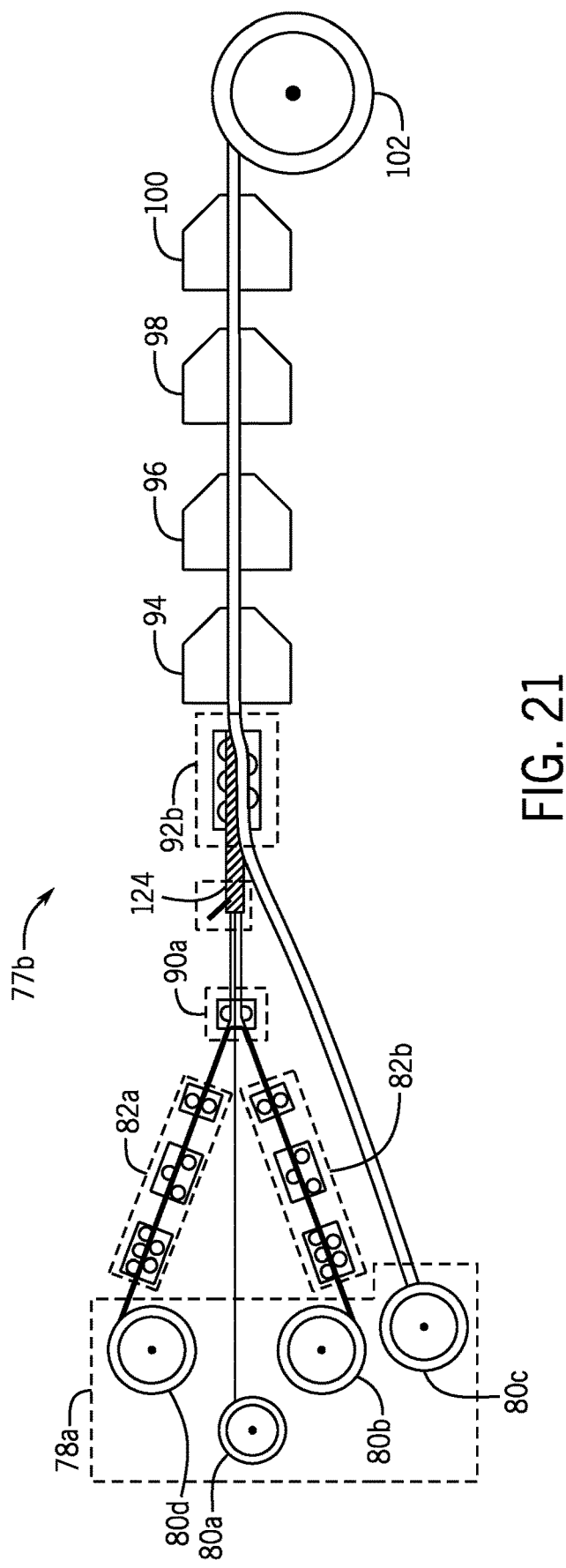
FIG. 21 is a schematic diagram of another manufacturing line for a cladded sensor wire with a plug, in accordance with an embodiment of the present disclosure.

FIG. 21 is a schematic diagram of a manufacturing line 77*b* that may be utilized to generate the cladded sensor wires 58 surrounded with conductors (e.g., 126 shown in FIGS. 24-27), and the inner cladded sensor wires 58 may be any of the cladded sensor wires 58 shown in FIGS. 10-15, in accordance with an embodiment of the present disclosure. In general, the optical fibers 54 are placed inside the recess 66 of the grooved conductor 56 followed by providing a cladding 74 around the grooved conductor 56 that includes the one or more optical fibers 54. It should be appreciated that the manufacturing line 77*b* may be used for any number of optical fibers 54.

At station 78*a*, optical fiber(s) 54, the grooved conductor 56, and the cladding 74 are provided in respective pay-offs 80*a*, 80*b*, and 80*c* respectively. Additionally, station 78*a* of the manufacturing line 77*b* includes a payoff 80*d* that includes the plug 110. In some embodiments, the pay-off 80*a* includes multiple optical fibers 54, or three pay-offs 80*a* are provided that each include an optical fiber 54. The grooved conductor 56 (e.g., a wire-like structure that is shaped to have the grooved conductor 56 cross section) is guided through the manufacturing line 77*b* to the station 82*b* which includes straighteners 84, rollers 88, and tension sensors 86 to maintain groove orientation, shaped conductor form, and alignment for a subsequent positioning of the cladding 74. The plug 110 is guided to a station 82*a* which includes straighteners 84, rollers 88, and tension sensors 86. At station 90*a*, the optical fibers 54 are inserted into the recess 66 of the grooved conductor 56. Additionally, the plug 110 is inserted into the recess 66 (e.g., into end portion 112 or portion 116) of the grooved conductor 56. It should be appreciated that the type of alignment rollers is dependent on the shape of the grooved conductor 56, the plug 110, and/or number of optical fibers 54.

At station 124, conductors may be formed (e.g., helically stranded) and positioned around the grooved conductor 56 and plug 110, which may further reinforce and improve the electrical properties of the electrical portion (e.g., grooved conductor 56) of the cladded sensor wire 58. At station 92*b*, the cladding 74 is positioned around the conductors (e.g., that were positioned around the grooved conductor 56 and the plug 110 in station 124), thus producing the cladded sensor wire 58. It should be appreciated that any suitable machines may be used for providing (e.g., positioning, forming) the cladding 74 around the grooved conductor 56 that includes the optical fiber(s) 54, such as insertion rollers. At station 94, the ends 73 and 75 of the cladding 74 are welded together to produce a welded connection 76. Then, the cladding 74 with the welded connection 76 are drawn through a die to create a tight fit between the grooved conductor 56 (e.g., along the outer surface 68 of the grooved conductor 56) and the cladding 74, at station 96. Then, the cladded sensor wire 58 may be inspected at station 98 before passing through a station 100 (e.g., that may include a capstan unit) to produce a packaged cladded sensor wire at station 102 (e.g., rolled up in a pay-off).

Figure 22:
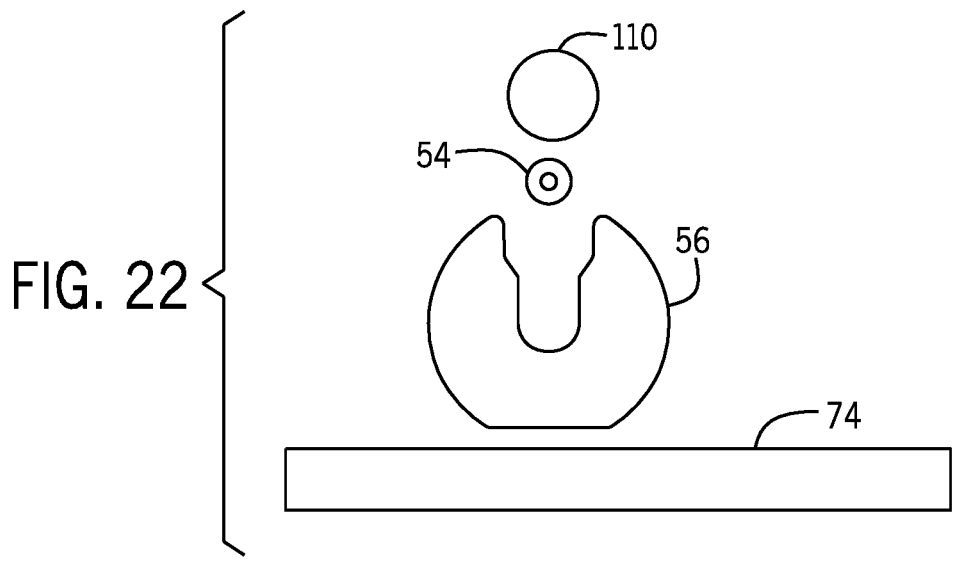
FIG. 22 is an illustration of a cross section of the components of a cladded sensor wire from an instant in time in the manufacturing line of FIG. 21, in accordance with an embodiment of the present disclosure.
Figure 23:
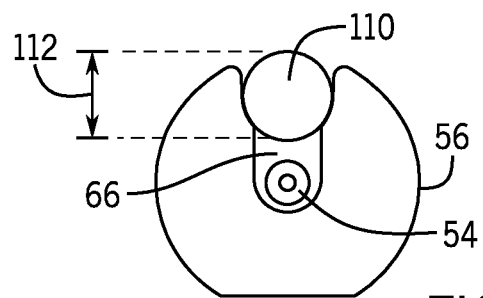
FIG. 23 is an illustration of a cross section of a partially assembled cladded sensor wire from another instant in time in the manufacturing line of FIG. 21, in accordance with an embodiment of the present disclosure.
Figure 24:
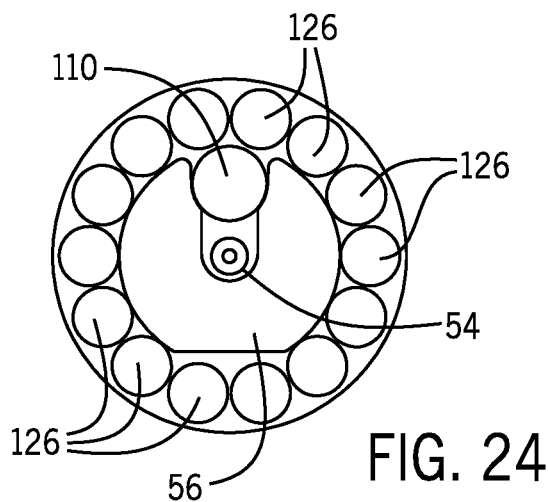
FIG. 24 is an illustration of a cross section of a partially assembled cladded sensor wire from another instant in time in the manufacturing line of FIG. 21, in accordance with an embodiment of the present disclosure.
Figure 25:
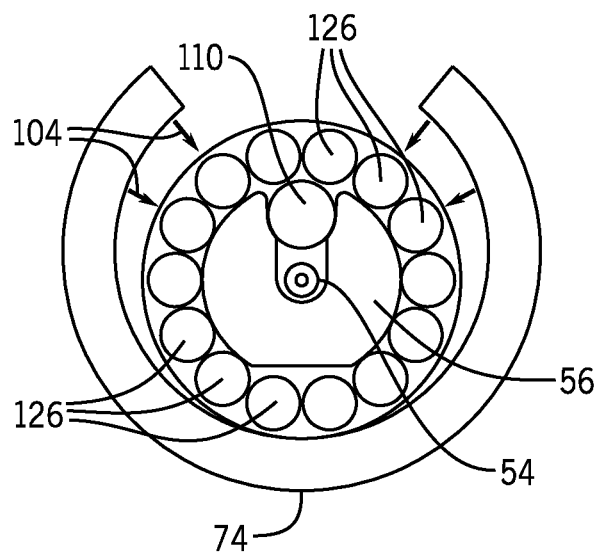
FIG. 25 is an illustration of a cross section of a partially assembled cladded sensor wire from another instant in time in the manufacturing line of FIG. 21, in accordance with an embodiment of the present disclosure.
Figure 25:
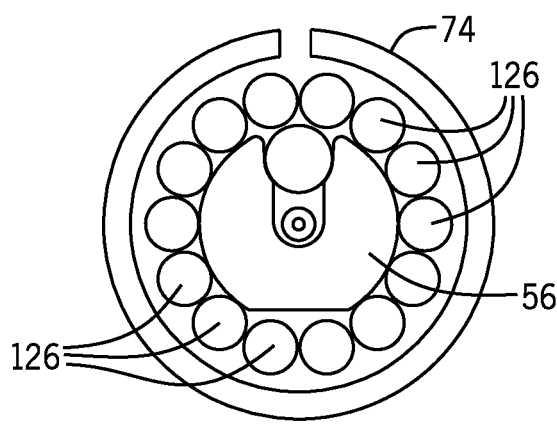
Figure 26:
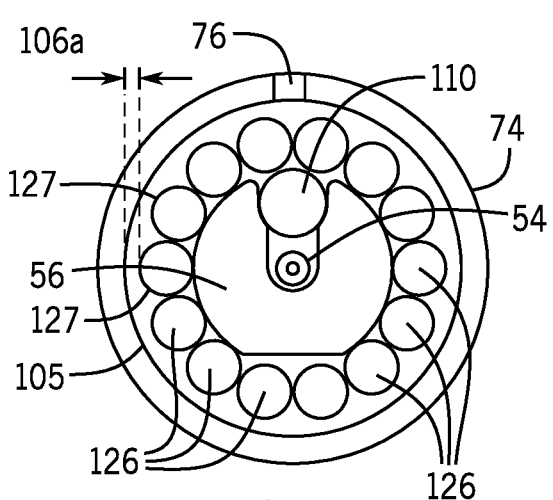
FIG. 26 is an illustration of a cross section of a cladded sensor wire from an instant in time in the manufacturing line of FIG. 21, in accordance with an embodiment of the present disclosure.
Figure 27:
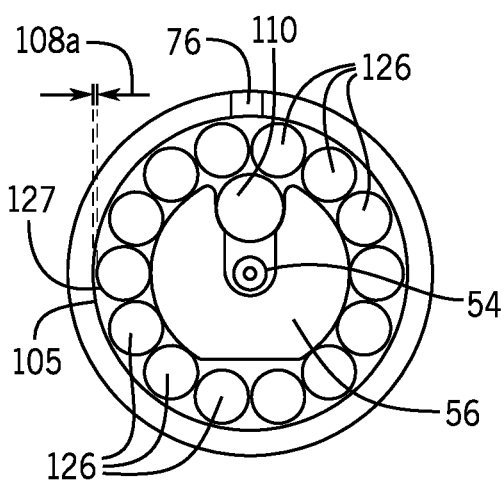
FIG. 27 is an illustration of a cross section of a cladded sensor wire from an instant in time in the manufacturing line of FIG. 21, in accordance with an embodiment of the present disclosure.

FIGS. 22-27 show several points in time of the optical fibers 54, the grooved conductor 56, cladding 74, and cladded sensor wire 58 during the stations 78a, 90a, 124, 92b, 94, and 96 of the manufacturing line 77b, as described herein. For example, FIG. 22 is an illustration of a cross section of the optical fibers 54, a cross section of the grooved conductor 56, a cross section of the cladding 74, and a cross section of the plug 110, which are in respective pay-offs 80a, 80b, 80c, and 80d, in station 78a. FIG. 23 shows three optical fibers 54 positioned in the recess 66 of the grooved conductor 56 and the plug 110 positioned in the end portion 112, representing a point in time of station 90a of the manufacturing line 77a. FIG. 24 shows conductors 126 positioned on the outer surface 68 of the grooved conductor 56, representing a point in time of the station 124 of the manufacturing line 77b. FIG. 25 (left) shows the cladding 74 positioned around the conductors 126 that surround the grooved conductor 56 and the plug 110, representing a point in time of station 92b of the manufacturing line 77b. The arrows 104 illustrate positioning of the cladding 74 disposed radially about the conductors 126. FIG. 25 (right) shows the cladding 74 positioned around the grooved conductor 56, representing a second point in time of station 92 of the manufacturing line 77b. FIG. 26 shows the cladding 74 connected along the ends 75 and 73 with a welded connection 76, representing a point in time of station 94 of the manufacturing line 77b. As illustrated, the outer surface 127 of each conductor 126 and the inner surface 105 of the cladding 74 are separated by a first distance 106a. FIG. 27 shows the cladding 74 connected along the ends 73 and 75 of the cladding 74 with a welded connection 76, representing a point in time of station 96 of the manufacturing line 77b. As illustrated, the outer surface 127 of each conductor 126 and the inner surface 105 of the cladding 74 are separated by a second distance 108a that is smaller than the first distance 106a. This is indicative of the tight fit created in station 96.

Figure 28:
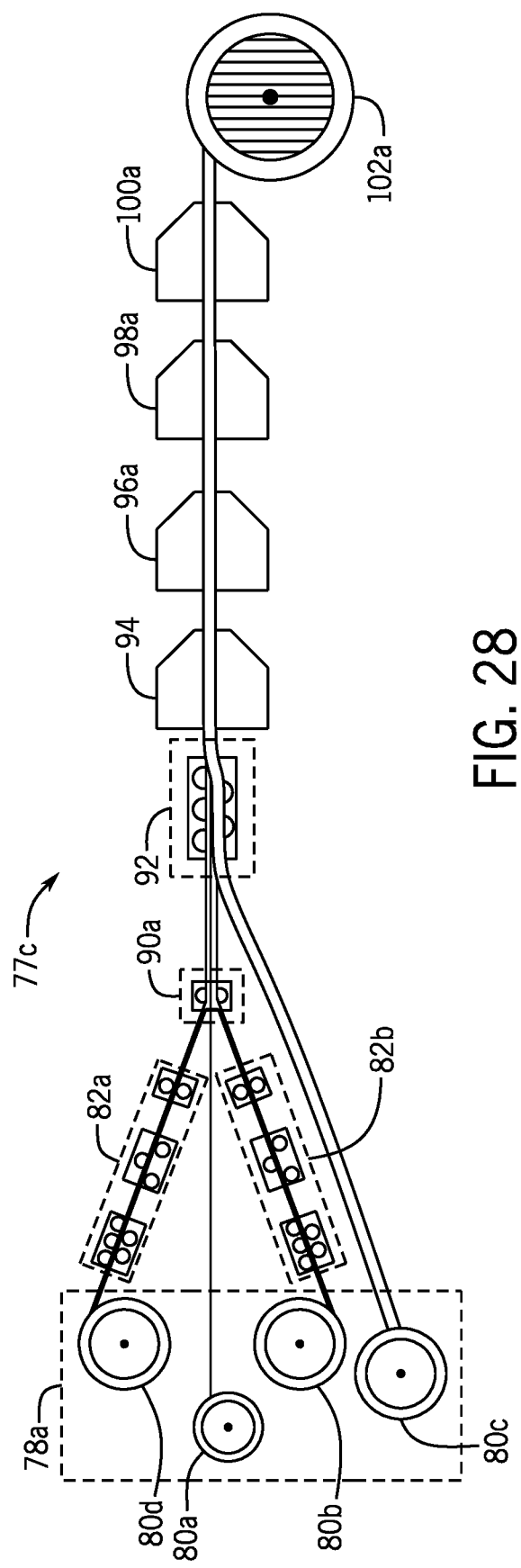
FIG. 28 is a schematic diagram of another manufacturing line for a cladded sensor wire with a plug, in accordance with an embodiment of the present disclosure.
Figure 29:
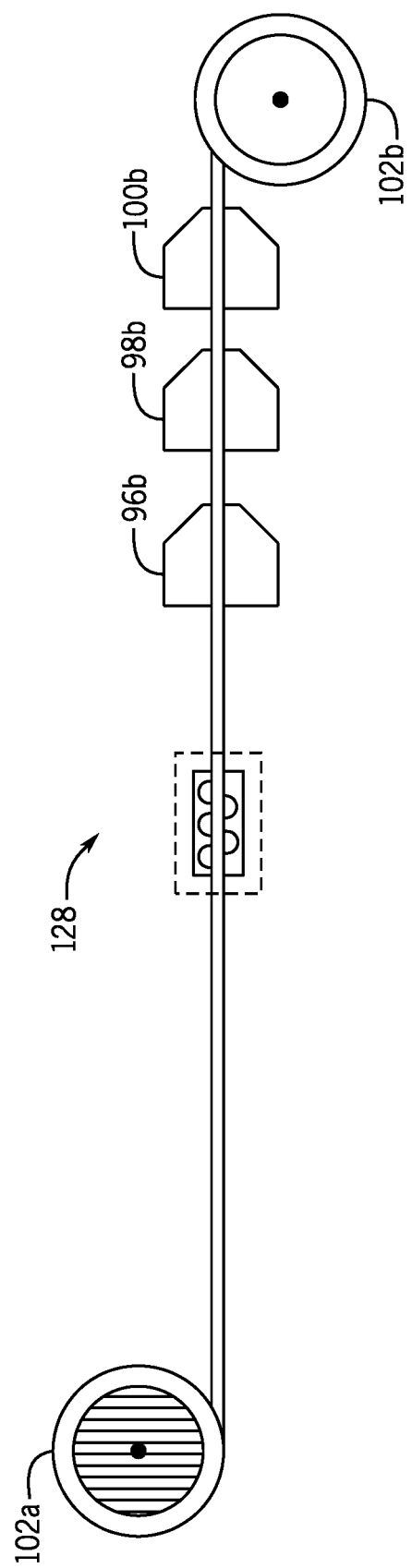
FIG. 29 is a schematic diagram of another manufacturing line for a cladded sensor wire with a plug, in accordance with an embodiment of the present disclosure.

As discussed herein, a manufacturing line 77 for a cladded sensor wire 58 may include an inspection station (e.g., station 98). In some embodiments, creating a tight fit between the cladding 74 and the grooved conductor 56 may prevent a pressure test during the manufacturing line 77. As such, FIGS. 28 and 29 are directed to a two-step manufacturing line providing cladding 74 on the grooved conductor 56. For example, one step may include partially drawing down the cladding 74 on the grooved conductor 56 by making the distance 106 (e.g., as described above for FIG. 8) suitable for a pressure test.

In certain embodiments, it may be advantageous to pressure test (e.g., within the recess 61 or 66) before the cladding 74 is tightened or drawn around the cladded sensors wire 58. Such certain advantages may include a more efficient method to pressure test the structure and maintain coupling between the components of the structure, and reducing any void spaces. FIG. 28 is a schematic diagram of a manufacturing line 77c that may be utilized to generate the cladded sensor wires 58, such as the cladded sensor wires discussed herein, in accordance with an embodiment of the present disclosure. In general, the optical fibers 54 are placed inside the recess 66 of the grooved conductor 56 followed by providing a cladding 74 around the grooved conductor 56 that includes the one or more optical fibers 54. It should be appreciated that the manufacturing line 77c may be used for any number of optical fibers 54.

At station 78a, optical fiber(s) 54, the grooved conductor 56, and the cladding 74 are provided in respective pay-offs 80a, 80b, and 80c respectively. Additionally, station 78a of the manufacturing line 77c includes a payoff 80d that includes the plug 110. In some embodiments, the pay-off 80a includes multiple optical fibers 54, or three pay-offs 80a are provided that each include an optical fiber 54. The grooved conductor 56 (e.g., a wire-like structure that is shaped to have the grooved conductor 56 cross section) is guided through the manufacturing line 77c to the station 82b which includes straighteners 84, rollers 88, and tension sensors 86 to maintain groove orientation, shaped conductor form, and alignment for a subsequent positioning of the cladding 74. The plug 110 is guided to a station 82a which includes straighteners 84, rollers 88, and tension sensors 86. At station 90a, the optical fibers 54 are inserted into the recess 66 of the grooved conductor 56. Additionally, the plug 110 is inserted into the recess 66 (e.g., into end portion 112 or portion 116) of the grooved conductor 56. It should be appreciated that the type of alignment rollers is dependent on the shape of the grooved conductor 56, the plug 110, and/or number of optical fibers 54.

At station 92, the cladding 74 is positioned around the conductors (e.g., that were positioned around the grooved conductor 56 and the plug 110 in station 120), thus producing the cladded sensor wire 58. It should be appreciated that any suitable machines may be used for providing (e.g., positioning, forming) the cladding 74 around the grooved conductor 56 that includes the optical fiber(s) 54, such as insertion rollers. At station 94, the ends 73 and 75 of the cladding 74 are welded together to produce a welded connection 76. Then, at station 96a, the cladding 74 with the welded connection 76 are drawn partially through a die to leave a gap (e.g., suitable first distance 106 as shown in FIG. 8) between the grooved conductor 56 (e.g., along the outer surface 68 of the grooved conductor 56) and the cladding 74. Then, at station 98a, the welded connection 76 may be inspected by suitable methods (e.g., eddy current, laser diameter), before the cladding is loaded onto a pay-off (e.g., at station 102a) that includes a cladded sensor wire 58 that is partially drawn. In some embodiments, a pressure test may occur at or after station 96a. For example, it may be advantageous to perform a pressure test, and if the measured pressure is within a threshold, either stop or continue with the additional steps of the manufacturing line 77c, or at an inspection line 128, described below.

FIG. 29 shows an inspection line 128 for the partially drawn cladded sensor wire 58 from manufacturing line 77c. The process begins with providing (e.g., with guided rollers) the partially drawn cladded sensor wire 58 to the station 96b where the gap (e.g., distance 106 from FIG. 8) is drawn to form a tight fit (e.g., distance 108 from FIG. 8). Then, the full drawn cladded sensor wire 58 is inspected at station 96c to ensure the weld surface is free of pinholes. Finally, the cladded sensor wire 58 is provided by the station 100b (e.g., a capstan unit) to the take up unit at station 102.

As such, the present disclosure is directed to a cladded sensor wire 58. The cladded sensor wire 58 includes one or more optical fibers 54 that are surrounded by a grooved conductor 56. The grooved conductor 56 may include various forms as described, for example, in FIGS. 8-13. The grooved conductor 56 is surrounded by a cladding 74 which improves reduces the effect of the harsh downhole conditions on the optical fibers 54 and/or grooved conductor The present techniques eliminate the risk of gas through the optical fibers, reduce the optical strain of the fibers to maximize the safe working load of the cable and increase coupling of the optical fibers and the other components of the cable for better optical measurements signal to noise ratio, the power delivery of the cable, the telemetry performance.. Another embodiment of the present disclosure relates to the manufacturing of the cladded sensor wire 58. In one embodiment, the components of the sensor cladded wire that are interior to the cladding are coated with silicone to reduce the likelihood of gas leaks. In another embodiment, the sensor cladded wire includes a plug that may provide structural support for and improved mechanical durability of the optical fibers.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An electrical-optical device, comprising:
at least two optical fibers;
a grooved conductor that includes a recess that extends radially outward from a central portion of the grooved conductor to an end portion of the recess, wherein the at least two optical fibers are positioned within the recess, wherein one of the at least two optical fibers is adjacent the central portion of the grooved conductor and the other optical fiber is disposed between the optical fiber adjacent the central portion of the grooved conductor and the end portion of the recess;
wherein the at least two optical fibers are fixed in the position within the recess; and
a cladding disposed around the grooved conductor and over the end portion of the recess forming a tube, wherein the at least two optical fibers are maintained inside the recess of the grooved conductor, wherein the cladding includes a welded connection along a first end and a second end of the cladding, and wherein the cladding provides increased resistance to mechanical stress and reduced likelihood of gas intrusion to the at least two optical fibers and gas leakage to the electrical-optical device.

2. The electrical-optical device of claim 1, wherein the welded connection is radially offset from the end portion of the recess.

3. The electrical-optical device of claim 1, further comprising a plug that resides within the end portion of the recess to improve a collapse and shear resistance of the electrical-optical device.

4. The electrical-optical device of claim 3, wherein the grooved conductor and the plug are surrounded by a plurality of stranded wire.

5. The electrical-optical device of claim 1, further comprising a filler material that fills a portion of the recess that does not include the at least two optical fibers.

6. The electrical-optical device of claim 1, further comprising an additional grooved conductor that is coupled to the grooved conductor along an interface.

7. The electrical-optical device of claim 6, wherein the additional grooved conductor includes a second recess, wherein an inner surface of the additional grooved conductor partially surrounds the at least two optical fibers.

8. The electrical-optical device of claim 1, wherein the grooved conductor is a continuous, single unit composed of a conducting material.

9. The electrical-optical device of claim 8, wherein the conducting material is copper.

10. A method of manufacturing an electrical-optical cable for a downhole device, comprising:
providing a grooved conductor and at least two optical fibers, wherein the grooved conductor includes a recess that extends radially outward from a central portion of the grooved conductor to an end portion of the recess;
coupling at least one optical fiber of the at least two optical fibers to the grooved conductor by positioning the at least two optical fibers into the recess, wherein one of the at least two optical fibers is adjacent the central portion of the grooved conductor and the other optical fiber is disposed between the optical fiber adjacent the central portion of the grooved conductor and the end portion of the recess, wherein the at least two optical fibers are fixed in the position within the recess;
surrounding an outer surface of the grooved conductor with a cladding; and
connecting a first end of the cladding to a second end of the cladding and forming a seal along the connection.

11. The method of manufacturing of claim 10, wherein positioning a plug into an end portion of the recess of the grooved conductor after the at least two optical fibers are positioned within the recess of the grooved conductor.

12. The method of manufacturing of claim 10, wherein the seal formed along the connection of the first end and the second end of the cladding is radially offset from the recess.

13. The method of manufacturing of claim 10, further comprising positioning a plug into an end portion of the recess of the grooved conductor after coupling the at least two optical fibers.

14. The method of manufacturing of claim 13, further comprising surrounding the outer surface of the grooved conductor and the plug with a plurality of stranded wire.

15. The method of manufacturing of claim 10, wherein surrounding the outer surface of the grooved conductor with the cladding comprises forming a round tube of cladding around the grooved conductor.

16. The method of manufacturing of claim 15, further comprising creating a tight fit between the cladding and grooved conductor after forming a round tube of cladding around the grooved conductor.

17. The method of manufacturing of claim 10, further comprising filling one or more voids between the grooved conductor and the at least two optical fibers after coupling the at least two optical fibers to the grooved conductor.

18. A method of manufacturing an electrical-optical cable for a downhole device, comprising:
providing a grooved conductor and at least two optical fibers, wherein the grooved conductor includes a recess that extends radially outward from a central portion of the grooved conductor to an end portion of the recess, and wherein a cross section of the grooved conductor is not entirely circular;
coupling the at least two optical fibers to the grooved conductor by positioning the at least two optical fibers into the recess wherein one of the at least two optical fibers is adjacent the central portion of the grooved conductor and the other optical fiber is disposed between the optical fiber adjacent the central portion of the grooved conductor and the end portion of the recess, wherein the at least two optical fibers are fixed in the position within the recess;
providing a filler material to fill a portion within the recess that is not occupied by the at least two optical fibers;
surrounding an outer surface of the grooved conductor with a cladding;

connecting a first end of the cladding to a second end of the cladding and forming a seal along the connection.

19. The method of manufacturing of claim 18, further comprising partially drawing down the cladding around the grooved conductor;

measuring a pressure within one or more void spaces between the cladding and the grooved conductor; and further drawing down the cladding around the grooved conductor when the pressure is within a threshold range.

20. The method of manufacturing of claim 18, further comprising filling one or more voids between the grooved conductor and the at least two optical fibers after coupling the at least two optical fibers to the grooved conductor.

\* \* \* \* \*